US008147643B1

(12) United States Patent
Valenti, Jr. et al.

(10) Patent No.: US 8,147,643 B1
(45) Date of Patent: Apr. 3, 2012

(54) BAR CODE LABEL BOOK SINGLE PASS MANUFACTURING PROCESS

(75) Inventors: F. Paul Valenti, Jr., Barrington, IL (US); Dan Hedger, Grayslake, IL (US); Carl Opel, Carol Stream, IL (US)

(73) Assignee: Chicago Tag & Label, Inc., Libertyville, IL (US)

( * ) Notice: Subject to any disclaimer, the term of this patent is extended or adjusted under 35 U.S.C. 154(b) by 245 days.

(21) Appl. No.: 12/157,069

(22) Filed: Jun. 6, 2008

(51) Int. Cl.

| | |
|---|---|
| ***B29C 65/52*** | (2006.01) |
| ***B29C 65/72*** | (2006.01) |
| ***B32B 37/10*** | (2006.01) |
| ***B32B 38/04*** | (2006.01) |
| ***B42C 19/06*** | (2006.01) |
| *B32B 37/12* | (2006.01) |
| *B32B 37/14* | (2006.01) |
| *B32B 38/10* | (2006.01) |
| *B42C 11/04* | (2006.01) |

(52) U.S. Cl. ................ 156/258; 156/250; 100/2; 100/3; 100/39; 270/1.02; 270/1.03; 270/45; 270/52.01; 270/52.02; 270/52.07; 412/4; 412/8

(58) Field of Classification Search .................. 156/250, 156/258, 277; 100/2, 3, 39; 270/1.02, 1.03, 270/45, 52.01, 52.02, 52.07; 412/4, 8
See application file for complete search history.

(56) References Cited

U.S. PATENT DOCUMENTS

| | | | | |
|---|---|---|---|---|
| 3,966,185 A * | 6/1976 | McCain et al. | 270/37 |
| 4,050,686 A * | 9/1977 | McCain et al. | 270/52.09 |
| 4,145,038 A | 3/1979 | Mol | |
| 4,194,832 A * | 3/1980 | Tabayashi | 399/306 |
| 4,900,001 A * | 2/1990 | Lapeyre | 270/1.01 |
| 4,932,579 A | 6/1990 | Simonelic et al. | |
| 5,106,069 A | 4/1992 | Wolf et al. | |
| 5,137,409 A | 8/1992 | Honegger | |
| 5,437,534 A | 8/1995 | Gales | |
| 5,489,969 A | 2/1996 | Soler et al. | |
| 6,572,093 B1 | 6/2003 | Scholta | |

(Continued)

FOREIGN PATENT DOCUMENTS

DE 4314511 11/1994

OTHER PUBLICATIONS

English translation of DE4314511A1—Oct. 11, 1994.*

(Continued)

*Primary Examiner* — Sonya Mazumdar
(74) *Attorney, Agent, or Firm* — Ice Miller LLP

(57) ABSTRACT

A method for manufacturing a pro label book includes printing static indicia on a web of label material, applying an adhesive to each portion of the web of label material that will become a label page in a pro label book that is not the portion of the web of label material that will become a top page of a label book to be formed if the adhesive is applied to a top surface of the web of label material or a bottom page of a label book to be formed if the adhesive is applied to the bottom surface of the web of label material, printing variable information on the web of label material, sheeting the web of label material to form label pages, and batching the label pages together utilizing the applied adhesive. Certain embodiments include attaching one of a backer or a cover to the web of label material following the printing static indicia step.

20 Claims, 13 Drawing Sheets

U.S. PATENT DOCUMENTS

| | | | | |
|---|---|---|---|---|
| 6,733,006 | B2 | 5/2004 | Kobayashi et al. | |
| 6,814,004 | B2 * | 11/2004 | Lofthus et al. | 101/485 |
| 6,966,553 | B2 | 11/2005 | Rathert | |
| 6,994,337 | B1 | 2/2006 | Cracknell et al. | |
| 7,261,507 | B2 | 8/2007 | Horii et al. | |
| 2005/0167044 | A1 * | 8/2005 | Exeter et al. | 156/302 |
| 2006/0249893 | A1 | 11/2006 | Kubo et al. | |
| 2007/0053020 | A1 | 3/2007 | Kubo et al. | |
| 2007/0158894 | A1 | 7/2007 | Hasegawa | |
| 2007/0166130 | A1 | 7/2007 | Kurabayashi et al. | |
| 2007/0272361 | A1 * | 11/2007 | Cracknell et al. | 156/578 |

OTHER PUBLICATIONS

English translation of claims of DE4314511A1; Klaus, Heyer—Nov. 10, 1994.*

English translation of description of DE4314511A1; Klaus, Heyer—Nov. 10, 1994.*

English translation of abstract of DE4314511A1; Klaus, Heyer—Nov. 10, 1994.*

Definition of "film"—Thesaurus.com; Jan. 2011—http://thesaurus.com/browse/film.*

* cited by examiner

BAR CODE LABEL BOOK SINGLE PASS MANUFACTURING PROCESS

BACKGROUND AND SUMMARY

This disclosure relates to manufacturing methods for label booklets or pads and more particularly to a manufacturing process for label booklets or pads that facilitate automated insertion of a cover or backer sheet.

Many businesses have implemented practices wherein they utilize self adhesive or pressure sensitive labels to identify items in some distinct manner, such as, for example, by attaching a barcode to the item that contains a unique identification number. Often such labels are contained in pads or booklets commonly called pro-label books or bar code label books. Such bar code label books generally contain twenty-five or fifty pages per book but can contain any quantity of pages. Each page of the bar code label book has one or multiple labels with serial numbers or tracking numbers, such as bar codes and human readable numbers, and a cover or a backer. The numbering can be variable, sequencing in any order desired.

According to one aspect of the disclosure, a method for manufacturing a pro label book comprises several steps. One step includes printing static indicia on a web of label material. Another step includes printing variable information on the web of label material. In another step, an adhesive is applied to each portion of the web of label material that will become a label page in a pro label book that is not the portion of the web of label material that will become a top page of a label book to be if the adhesive is applied to the top surface of the web of label material or a bottom page of a label book to be formed if the adhesive is applied to a bottom surface of the web of label material. Another step includes sheeting the web of label material to form label pages. Another step includes joining the label pages together using the applied adhesive.

According to one aspect of the disclosure, a method for manufacturing a pro label book comprises partially cutting through the web of label material at appropriate locations to define discrete labels prior to the attaching a backer or cover step, attaching one of a backer or a cover to a web of label material following the partially cutting through step, printing variable information on the web of label material, sheeting the web of label material to form label pages, and joining the label pages together.

According to one aspect of the disclosure, a method for manufacturing a pro label book comprises providing a web of label material including a web of pressure sensitive label material removably adhesively secured to a web of liner material, printing static indicia by passing the web of label material through at least one printhead that transfers ink by impression wherein static indicia is printed on the pressure sensitive label material of the provided web of label material, die cutting the web of label material at appropriate locations to at least substantially cut through the web of pressure sensitive label material but not to cut through the web of liner material to form at least one discrete label on each portion of the web of label material that will become a label page in a pro label book, attaching one of a backer or a cover to a web of label material following the die cutting step, printing variable indicia on the web of label material in the location of each discrete label, sheeting the web of label material to form label pages, and joining the label pages together.

Additional features and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The features and advantages of this disclosure, and the manner of attaining them, will be more apparent and better understood by reference to the following descriptions of the disclosed methods and systems, taken in conjunction with the accompanying drawings, wherein.

DETAILED DESCRIPTION

Figure 1A:
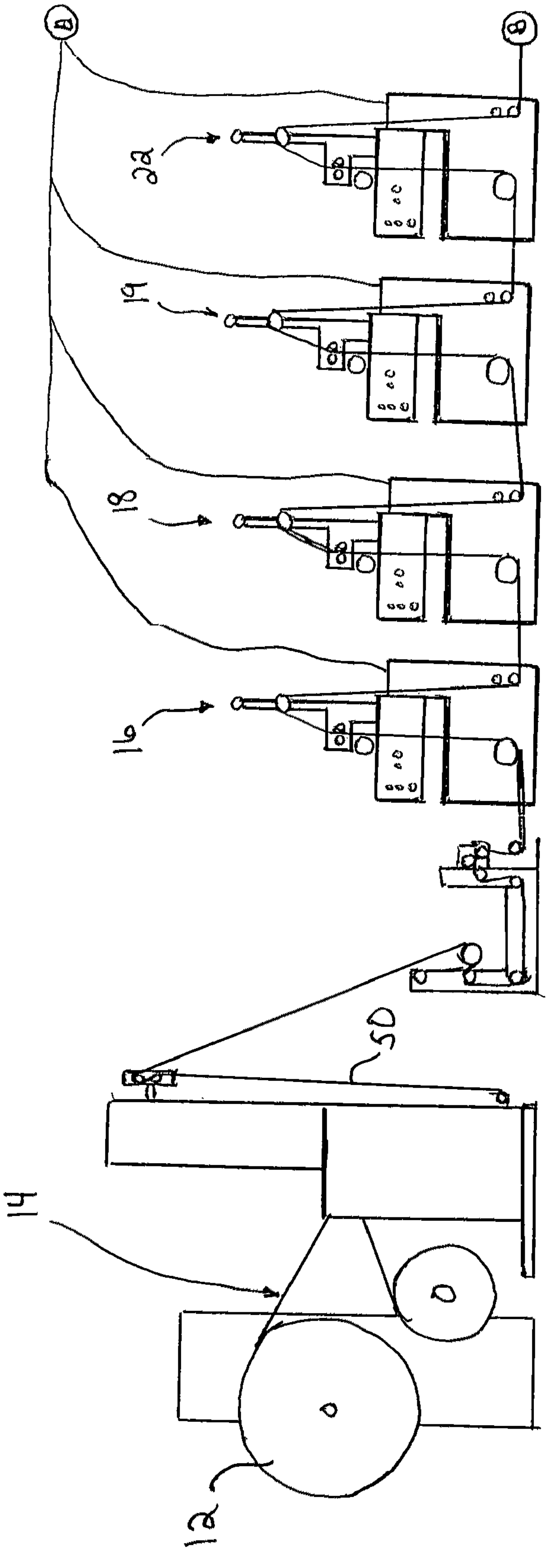
FIG. 1 (comprising FIGS. 1A, 1B and 1C) is a side elevation view of one configuration of a system for forming a plurality of pro label books.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 7:
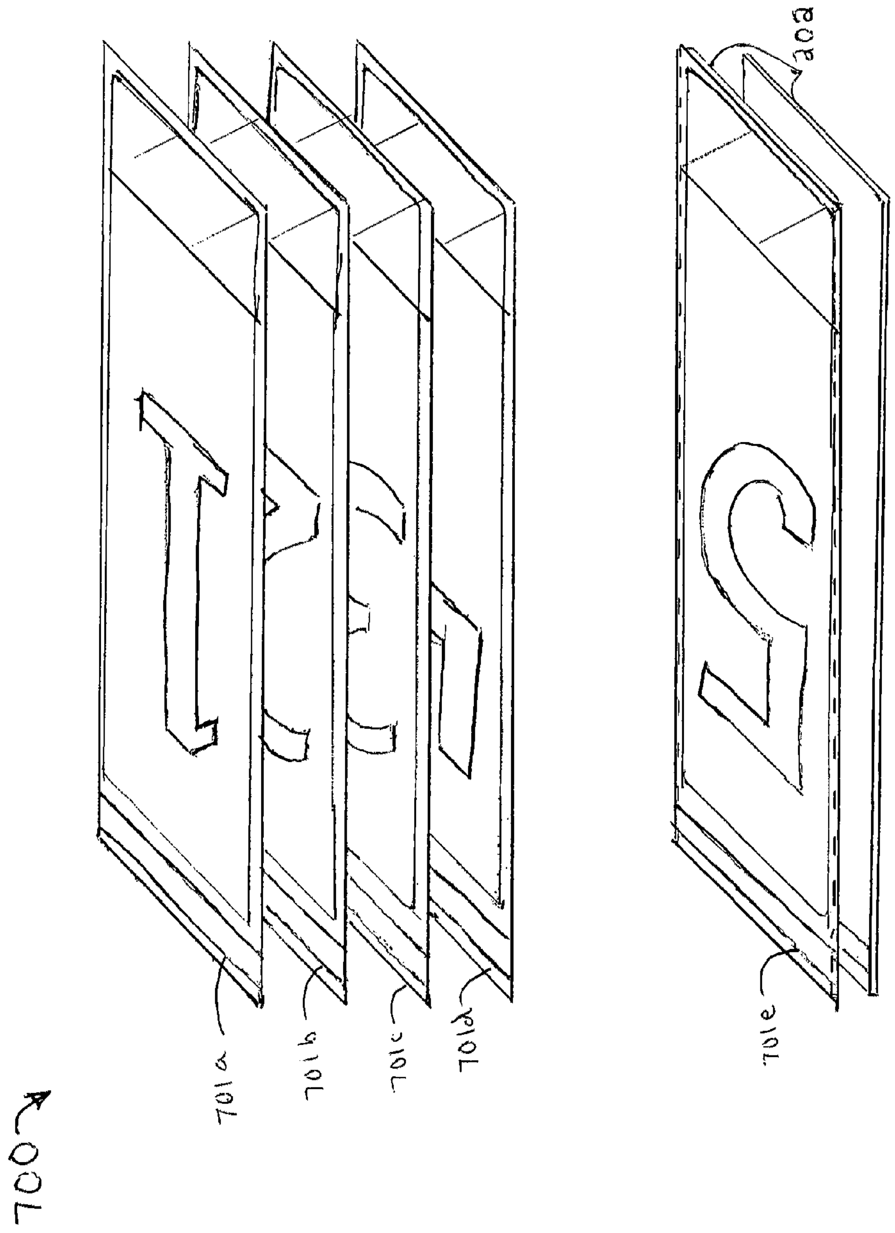
FIG. 7 is an exploded view of a simplified five page label book having a backer.
Figure 8:
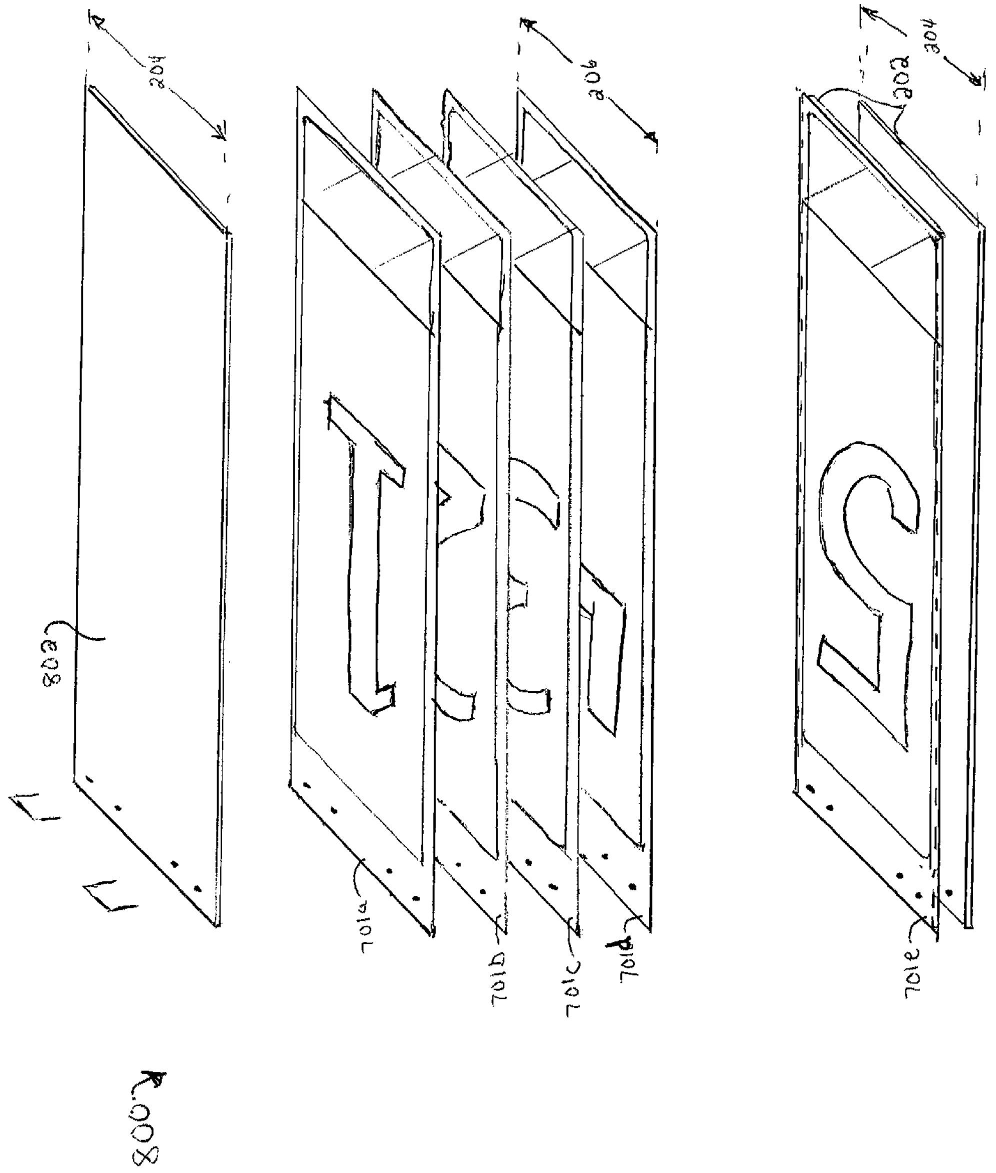
FIG. 8 is an exploded view of a simplified five page label book having a front cover and a backer and including stitches to help secure the label book together.
Figure 9:
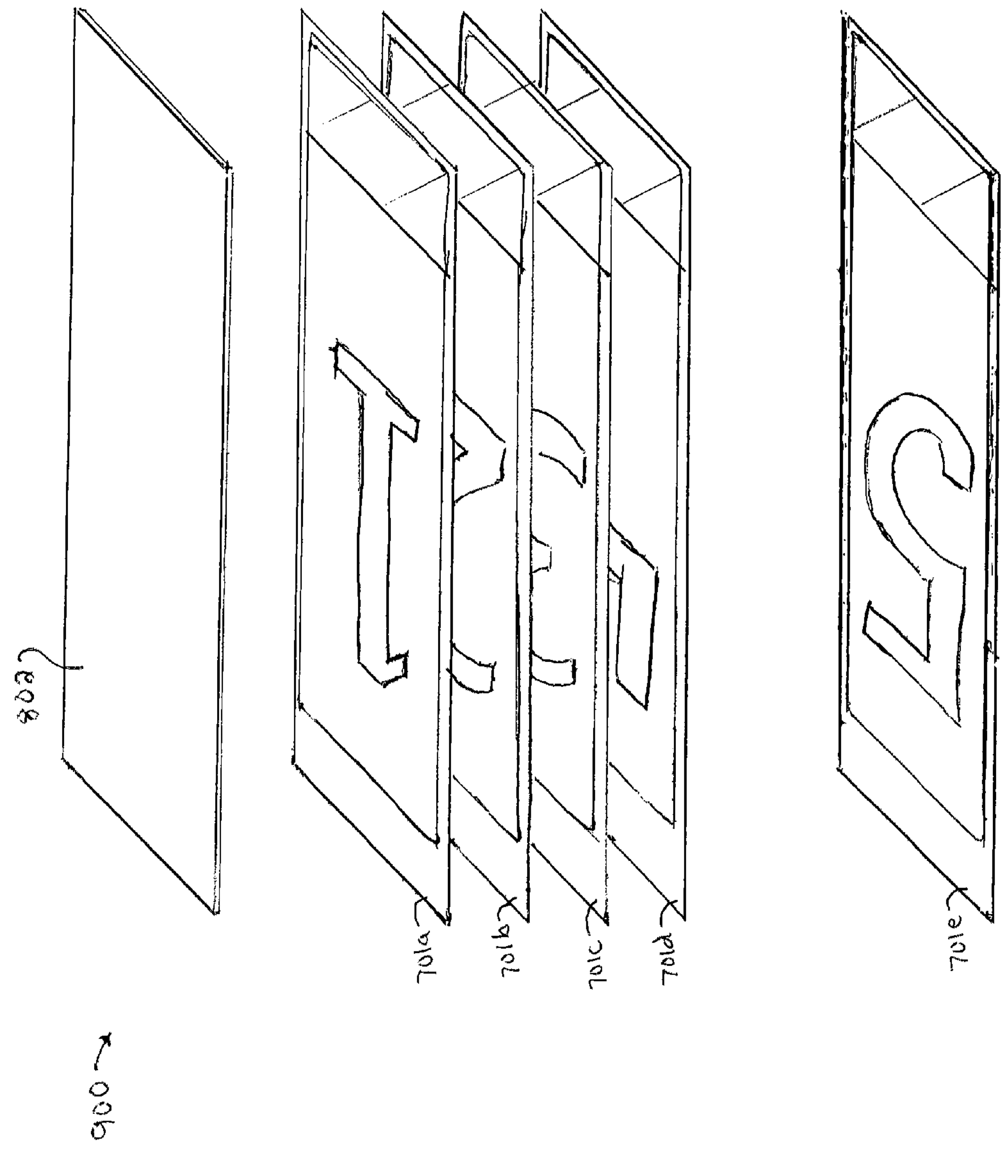
FIG. 9 is an exploded view of a simplified five page label book having a front cover.

In at least one embodiment of the present disclosure, at least one pro label book 700, 800, 900, as shown, for example, in FIGS. 7-9, respectively, having a backing, back cover or backer 202 (e.g. books 700, 800) and/or a cover 802 (e.g. books 800, 900), is formed from a continuous roll or web of label material 50. In at least one embodiment of the present disclosure, such a plurality of discrete pro label books 700, 800, 900 include variable indicia.

Figure 10:
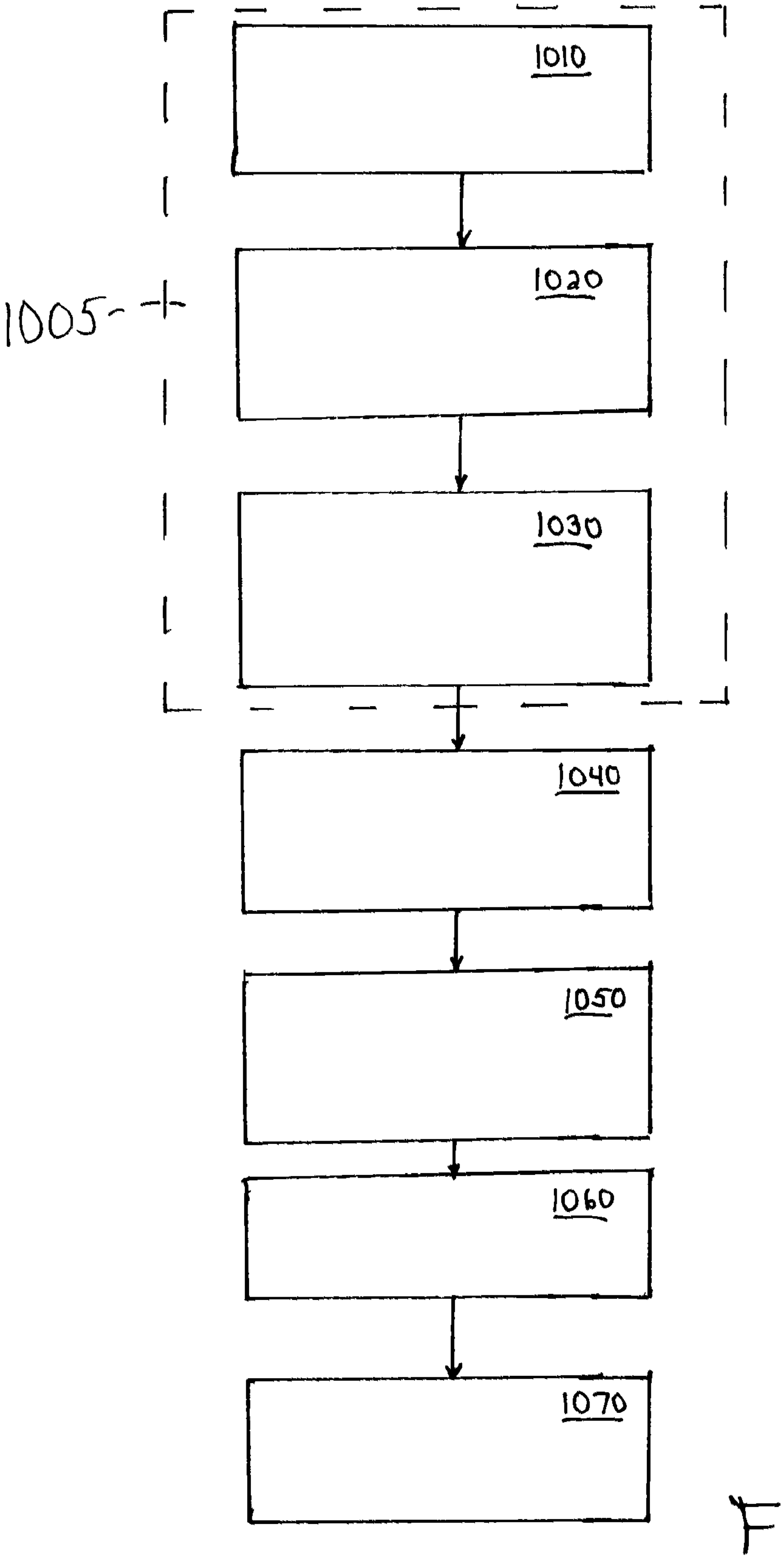
FIG. 10 shows a flowchart illustrating a method according to at least one embodiment of the present disclosure for creating a plurality of pro label books from a continuous roll or web of label material, wherein such labels include variable indicia.
Figure 11:
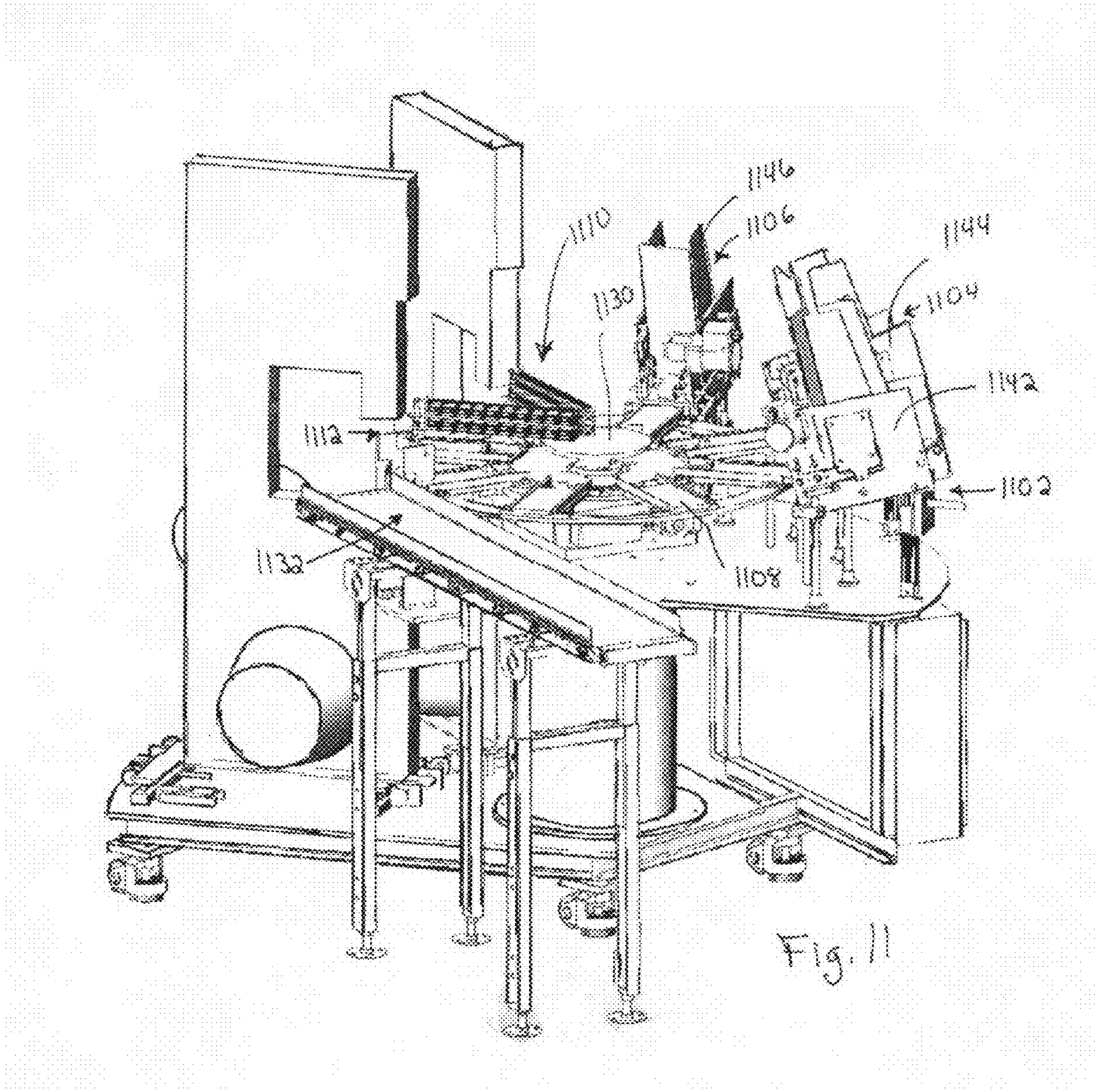
FIG. 11 is a perspective view of a rotary assembly and stitching machine used in certain embodiments of the disclosed system.

FIG. 10 shows a flowchart illustrating a method 1000 according to at least one embodiment of the present disclosure for creating a plurality of pro label books 700, 800, 900 from a continuous roll or web of label material 50, wherein such labels include variable indicia. In step 1010 of FIG. 10, variable indicia is printed on a roll or web of label material, which may be a liner-backed label material. In step 1020 of FIG. 10, other indicia is printed on the web of label material. In step 1030, portions of the web of label material are die cut to form distinct labels. In step 1040, at least one of a backer or cover is attached to an appropriate location on the web of label material. In step 1050, adhesive is applied to the web of label material. In step 1060, the web is cut to form pages of a pro label book. In step 1070 the pages of the pro label book are joined together to form a pro label book.

Figure 1B:
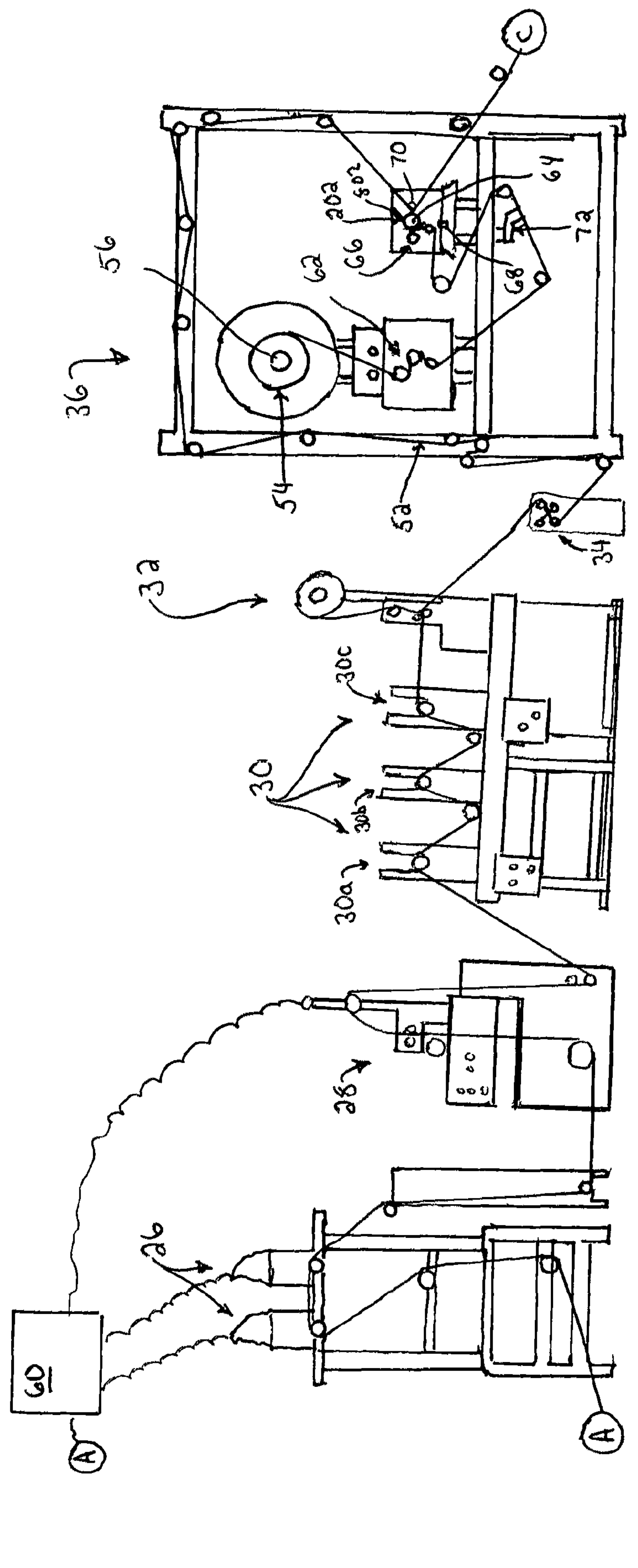
Figure 1C:
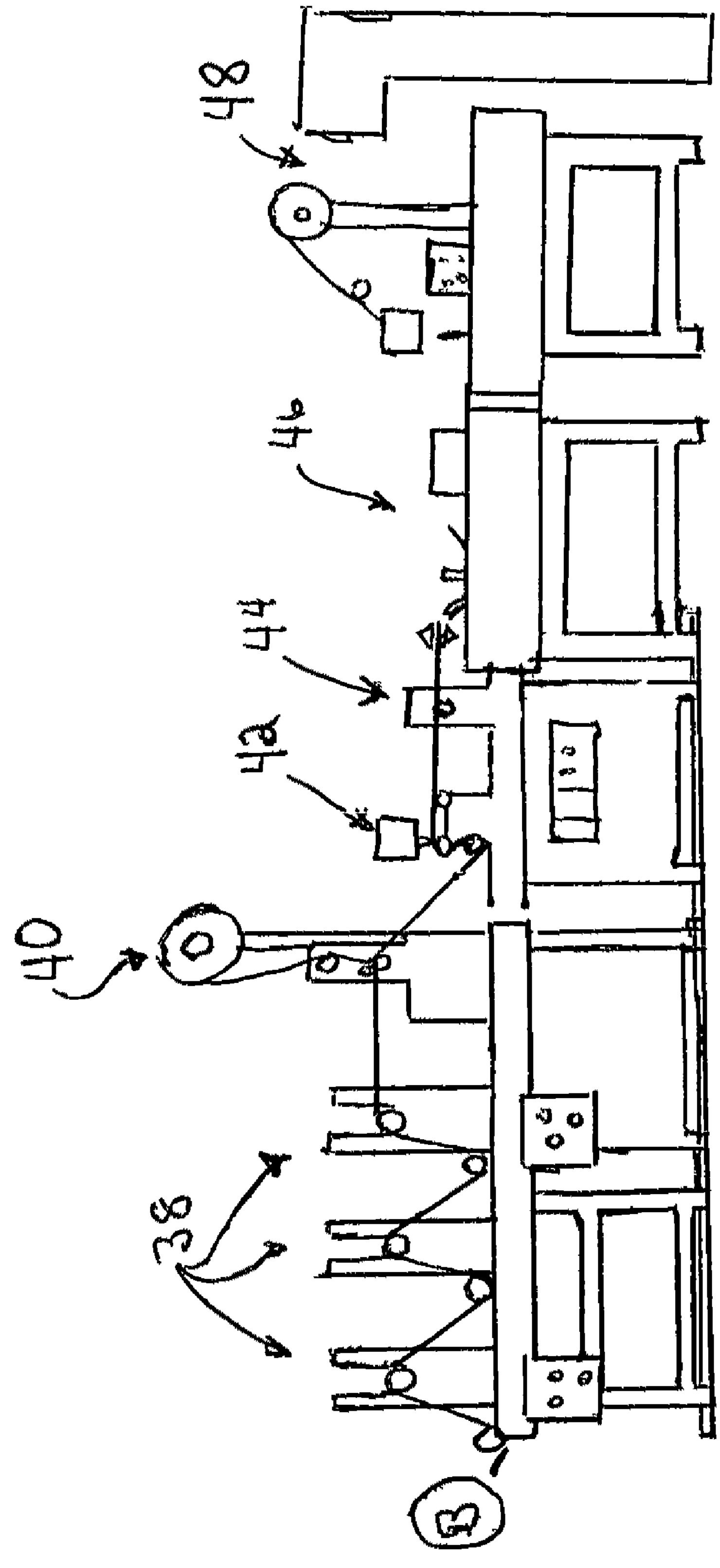

FIG. 1 shows system 10 according to at least one embodiment of the present disclosure for automated production of pro label books, such as, for example, pro label book 700, 800, 900. As shown for example in FIG. 1, a method of manufacturing pro label books may be carried out utilizing a label printing system 10. One embodiment of the disclosed system 10 for manufacturing pro label books includes a roll of pressure sensitive label stock 12, a roll of tag stock 54, a butt splicer or other type of unwinding mechanism 14, a plurality of static print stations 16, 18, 20, 22, one or more variable printers 26, a post variable printer static print station 28, one or more rotary die cutting station(s) 30, 38, one or more waste matrix removal station(s) 32, 40, a turn bar 34, at least one backer/cover insertion module 36, an adhesive applicator station 42, a sheeter station 44, a stacker station 46 and a stitching module 48. Non-illustrated embodiments of a system for manufacturing pro label books may include additional or fewer devices, stations, modules and/or mechanisms within the scope of the disclosure. For instance, one embodiment of a system for manufacturing pro label books does not include an additional stitching (stapling) module 48 following the stacker station 46. Other embodiments of the system for manufacturing pro label books include fewer or more static print stations. Additionally, except as specifically stated hereafter, certain stations, components and operations may be performed utilizing components, mechanisms, printers, modules and stations arranged in different orders than illustrated in FIG. 1.

Figure 2:
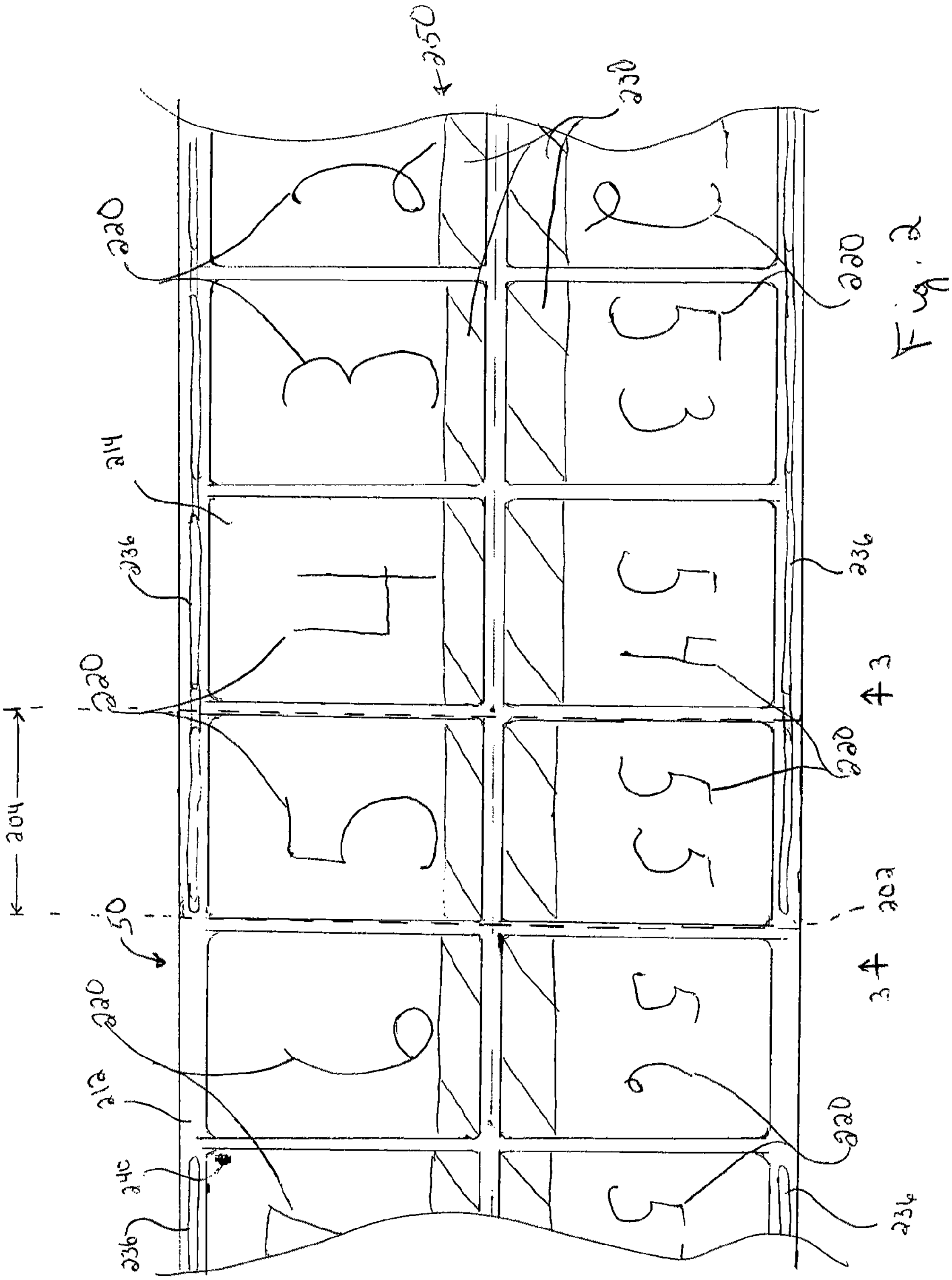
FIG. 2 is a simplified plan view of a web of label material that has had variable indicia printed on the face material and portions of the label sensitive material cut away and removed from the liner material, a backer attached to the back of the liner underlying the bottom labels in pro label books to be formed and adhesive placed along the edges of the web material on the face of each label to be formed that is not to be a top label in a pro label book and showing a configuration of the web wherein the web may be cut longitudinally in the center so that two label books may be formed from each batch length of web material.
Figure 4:
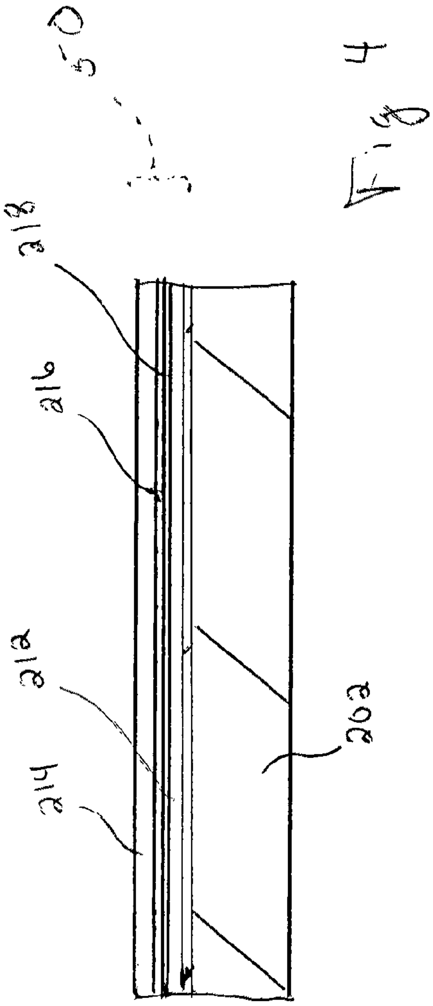
FIG. 4 is a blown-up view of the portion of the web of label material enclosed in the circle 4 in FIG. 3.
Figure 3:
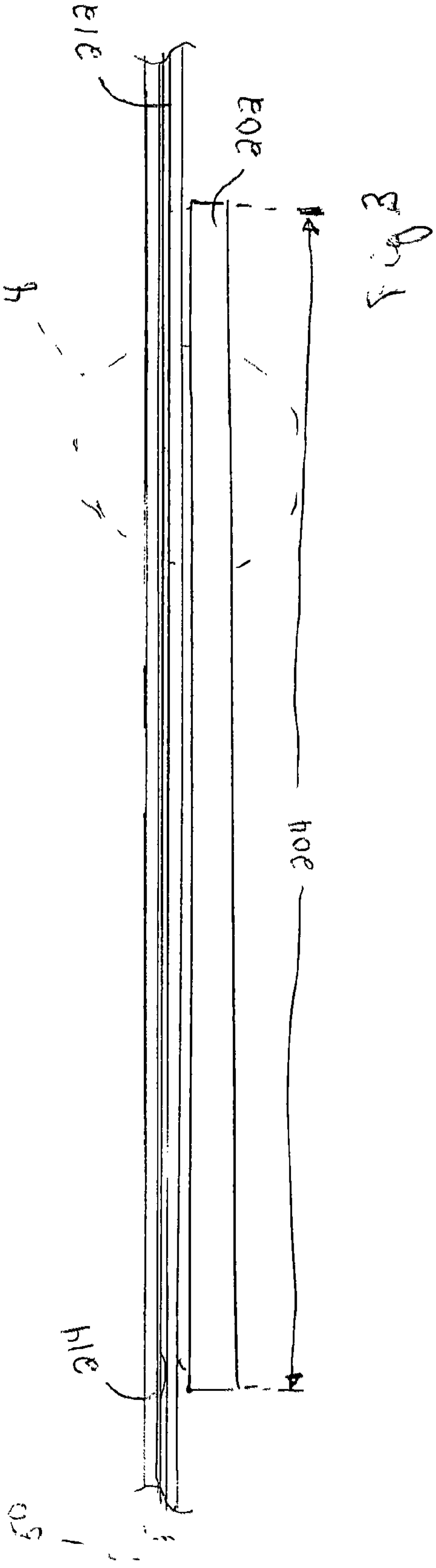
FIG. 3 is a side elevation view taken along line 3-3 of the portion of the web shown in FIG. 2 including the backer material.

In at least one embodiment of a system according to the present disclosure, as shown, for example, in FIGS. 2-4, the web of pressure sensitive label material 50 comprises a liner component 212 and a label material or face component 214, with a pressure-sensitive adhesive 216 interposed between the liner component 212 and the label material component 214. In such an embodiment, the label material component 214 of the web of label material 50 may be readily separated from the liner component 212 of the web of label material 50, with interposed pressure-sensitive adhesive 216 remaining with the label material component 214 of the web of label material 50 after separation. Thus, the pressure-sensitive adhesive 216 may be considered as a layer of the label material component 214. In at least one embodiment, the liner component 212 of the web of label material 50 comprises a silicone coating 218 adjacent to the label material component 212.

In at least one embodiment of system 10 according to the present disclosure face stock free of adhesive is unwound from first material source and fed through system 10 at a predetermined rate. In such embodiment of system 10, liner material is unwound from second material source and fed through system 10 at the same predetermined rate. In such embodiment, an adhesive coating head and laminating station applies a coat of adhesive material to either the face stock or liner stock and the laminating machine 14 removably adhesively secures the face stock to the liner material to form a web of pressure sensitive label material 50 which is fed through the system 10 at the predetermined rate. In at least one embodiment of system 10, uncoated liner stock may be provided and a silicone coating machine may apply silicone to the uncoated liner stock only in desired areas prior to the application of the adhesive described above. In embodiments wherein rolls of label material 50 are provided and mounted on the first and or second material sources, the web of label material 50 is fed through the system 10 at a predetermined rate.

In the embodiment of system 10 shown in FIG. 1, following the butt splicer or unroll mechanism 14, the web of label material 50 is fed through static print stations 16, 18, 20, 22, where indicia (such as, for example, static indicia 230) may be printed on the label material component 214. In at least one embodiment of system 10, print stations 16, 18, 20, 22 comprise rotary flexo-graphic print stations. In other embodiments, print stations 16, 18, 20, 22 comprise rotary letterpress printers, offset printers, or digital printers. In at least one embodiment of system 10, print stations 16, 18, 20, 22 are adapted to print a single color on the label material component 214 as the web of label material 50 moves under or through print stations 16, 18, 20, 22 according to a predetermined printing pattern. Multiple colors or no colors may be printed on the front or back of the web of label material 50 within the scope of the disclosure. The ink used in print stations 16, 18, 20, 22 is selected to be compatible with print stations 16, 18, 20, 22, the label component 214 of the web of label material 50, and the intended use of the plurality of labels to be formed from the web of label material 50. Such inks may include water-based flexo-graphic inks and UV curable inks. After being presented with the disclosure herein, one of ordinary skill in the relevant art will realize that other types of printers and other materials may be used to create indicia on the label material component of the web of label material 50 without departing from the spirit and scope of the present disclosure.

In at least one embodiment of system 10 according to the present disclosure, print stations 16, 18, 20, 22 are adapted to print static indicia 230 on the label material component 214 as the web of label material 50 moves under or through print stations 16, 18, 20, 22, i.e., print stations 16, 18, 20, 22 are adapted to print the same indicia 230 in the same pattern on each discrete label that is to be formed from the continuous roll or web of label material 50. In at least one embodiment of system 10, the actions of print stations 16, 18, 20, 22 may be controlled by a computer 60 (not shown in FIG. 1). For example, a computer 60 may control the timing of print stations 16, 18, 20, 22, and/or the alignment and registration of the web of label material 50 and print stations 16, 18, 20, 22, and/or other functions of print stations 16, 18, 20, 22.

Since it is a well known property of certain types of static print stations 16, 18, 20, 22 that the printing process applies a known pressure to the material being printed upon, in one embodiment of system 10, the material being printed upon should be of a substantially uniform thickness when it is being printed upon by the static print stations 16, 18, 20, 22. Thus, in such embodiments wherein printers of the type that apply a predetermined amount of pressure (such as, for example, flexo-graphic printheads) are utilized in print stations 16, 18, 20, 22, the print stations 16, 18, 20, 22 are positioned within the system so that the web passes through the print stations 16, 18, 20, 22 prior to a backer 202 or cover 802 being applied to the web of label material 50. The presence of a backer 202 or cover 802 on portions of the web of label material 50 would result in increased pressure being applied by such pressure applying print stations 16, 18, 20, 22 which might adversely affect the print quality or operation of the print stations 16, 18, 20, 22. Thus, in one embodiment of the disclosed method, a static printing operation is carried out prior to an application of a backer 202 or cover 802 to portions of the web of label material 50.

In at least one embodiment of the system 10, following printing of the static indicia 230, the web of label material 50 is transported through variable printer(s) 26. The web of label material 50 is transferred through the computerized variable printer 26, and variable data 220, such as sequential numbers and barcodes, is printed on the face of the label component 214. Variable printer 26 is adapted to print indicia (such as, for example, variable data or indicia 220) on the face of the pressure sensitive label component 214. In at least one embodiment of system 10, variable printer 26 is an ink jet printer. In at least one embodiment of system 10, variable printer 26 may be a laser printer. The inks, toners, or other printing materials used in variable printer 26 are selected to be compatible with variable printer 26, the label material 214, the inks and or dies utilized in the static print stations and the intended use of the labels of the pro label books 700, 800, 900 to be formed. After being presented with the disclosure herein, one of ordinary skill in the relevant art will realize that other types of printers and other materials may be used to create indicia on the label material 214 without departing from the spirit and scope of the present disclosure.

In at least one embodiment of system 10 according to the present disclosure, variable printer 26 is adapted to print variable indicia 220 on the face of the label material 214, i.e., variable printer 26 is adapted to print different indicia on at least two of the discrete labels that are to be formed from the continuous roll or web of label material 50. In at least one embodiment of system 10 according to the present disclosure, variable printer 26 is adapted to print different indicia 220 on each discrete label, as shown, for example, in FIGS. 2, 5, 6, that is to be formed from the continuous roll or web of label material 50. For example, variable printer 26 may be adapted to print a different address on different discrete labels, or may be adapted to print a different bar code on different discrete labels, or may be adapted to print a different maxicode on different discrete labels, or may be adapted to print different billing account information on different discrete labels, or may be adapted to print a different tracking number on different discrete labels. After being presented with the disclosure herein, one of ordinary skill in the relevant art will realize that other types of variable indicia 220 may be printed without departing from the spirit and scope of the present disclosure. Those skilled in the art will recognize that the numerals 1-6 and 52-56 shown in FIGS. 2-9 are intended as simplified representations of any variable indicia 220 which may be printed on the discrete labels.

In at least one embodiment of system 10 according to the present disclosure, the actions of variable printer 26 are controlled by computer 60. Although only one computer 60 is shown in FIG. 1, it should be understood that system 10 can include multiple computers 60. Computer 60 can include a personal computer, a computer terminal, and/or other types of computing devices as may occur to one of ordinary skill in the relevant art after being presented with the disclosure herein. In one embodiment, computer 60 is a personal computer. In at least one embodiment, a datafile of variable indicia 220 is stored on computer 60, which computer 60 is electronically interconnected with variable printer 26. Such electronic interconnection may be accomplished by hardwiring, radio frequency communication, or such other forms of electronic interconnection as may occur to one of ordinary skill in the relevant art after being presented with the disclosure herein. As the web of label material 50 passes under or through variable printer 26, computer 60 transmits data from the datafile to variable printer 26, which data is output by variable printer 26 as variable indicia 220 on the face of the label material component 214. In at least one embodiment of the present disclosure, variable printer 26 comprises computers, software, and printer systems.

In at least one embodiment of system 10 for automated production of a pro label books 700, 800, 900 according to the present disclosure, the web of label stock 50 including all indicia 220, 230 printed thereon may be converted by one or more optional converting operations. For example, in the embodiment of system 10 shown in FIG. 1, following variable printer(s) 26 the web of label material 50, including all indicia printed thereon, is fed through a post variable static print station 28.

In at least one embodiment of system 10, post variable printer 28 comprises a rotary flexo-graphic print station. In other embodiments, post variable printer 28 comprises a rotary letterpress printer, offset printer, or digital printer. In at least one embodiment of system 10, post variable printer 28 is adapted to print a single color on the label material component 214 as the web of label material 50 moves under or through post variable printer 28 according to a predetermined printing pattern. The ink used in post variable printer 28 is selected to be compatible with post variable printer 28, the label component 214 of the web of label material 50, and the intended use of the plurality of labels to be formed from the web of label material 50. Such inks may include water-based flexo-graphic inks and UV curable inks. After being presented with the disclosure herein, one of ordinary skill in the relevant art will realize that other types of printers and other materials may be used to create indicia on the label material component of the web of label material 50 without departing from the spirit and scope of the present disclosure.

In at least one embodiment of system 10 according to the present disclosure, post variable printer 28 is adapted to print static indicia 230 on the label material component 214 as the web of label material 50 moves under or through post variable printer 28, i.e., post variable printer 28 is adapted to print the same indicia 230 in the same pattern on each discrete label that is to be formed from the continuous roll or web of label material 50. Post variable printer 28 may apply a varnish, another color, or no color to the label material component 214 of the web of label material 50. In at least one embodiment of system 10, the actions of post variable printer 28 may be controlled by a computer 60. For example, a computer 60 may control the timing of post variable printer 28, and/or the alignment and registration of the web of label material 50 and post variable printer 28, and/or other functions of post variable printer 28.

Since it is a well known property of certain types of post variable printers 28 that the printing process applies a known pressure to the material being printed upon, in one embodiment of system 10, the material being printed upon should be of a substantially uniform thickness when it is being printed upon by the post variable printer 28. Thus, in such embodiments wherein a printer of the type that applies a predetermined amount of pressure (such as a flexo-graphic printhead) is utilized in post variable printer 28, the post variable printer 28 is positioned within the system so that the web passes through the post variable printer 28 prior to a backer 202 or cover 802 being applied to the web of label material 50. The presence of a backer 202 or cover 802 on portions of the web of label material 50 would result in increased pressure being applied by such pressure applying post variable printer 28 which might adversely affect the print quality or operation of the post variable printer 28. Thus, in one embodiment of the disclosed method, a static printing operation following the variable printing operation is carried out prior to an application of a backer 202 or cover 802 to portions of the web of label material 50.

Again since post variable printer 28 relies on a substantially uniform pressure being exerted on the material on which it is printing, in one embodiment of the system 10 and the method 1000, the post variable static printer 28 is positioned in the path of the web prior to the backer/cover insertion module 36 and prior to attachment of the backer 202 and/or cover 802 to the web of label material 50 so that the material passing through the printer 28 is of substantially uniform thickness.

This web of label material 50 then travels through rotary die station(s) 30, where the web can be die cut to create multiple label cavities, slits, peel tabs, or any other specified die cutting, on either the face or liner of the web. Rotary die stations 30 configured to cut through only the label component 214 of a web of label material 50 relies on proper positioning of the die relative to the material to be cut to ensure that the cut is to the desired depth. Thus, for proper operation, the web material being cut by a rotary die station should be of substantial uniform thickness when it passes through the rotary die station 30 that is configured to cut through only certain layers of the web material.

The web of label material 50, in one embodiment, is fed through a first die station 30*a*. In this embodiment of system 10, at first die station 30*a*, an undercut die, cuts through the liner material component 212 of the web of label material 50, but not through the face component 214, thereby creating a corner peel tab for one or more of the discrete labels that are to be formed from the continuous roll or web of label material 50.

Since first die station 30*a* is configured to cut through only the liner material component 212 of the web of label material 50 and not through the face material 214, in one embodiment of the system 10 and the method 1000, the first die station 30*a* is positioned in the path of the web 50 prior to the backer/cover insertion module 36 and prior to attachment of the backer 202 and/or cover 802 to the web of label material 50 so that the material passing through the first die station 30*a* is of substantially uniform thickness.

In another example of a die cutting operation, in the embodiment of system 10 shown in FIG. 1, following first die station 30*a*, the web of label material 50 is fed through a second die station 30*b*, where a die cuts through the face material component 214 of the web of label material 50, but not through the liner component 212 of the web of label material 50, thereby creating discrete labels that remain affixed to the liner component of the web of label material 50. It should be noted that it also is possible to die cut the boundaries of discrete labels before die cutting the corner peel tabs.

Since second die station 30*b* is configured to cut through only the label material component 214 of the web of label material 50 and not through the liner material 212, in one embodiment of the system 10 and the method 1000, the second die station 30*b* is positioned in the path of the web 50 prior to the backer/cover insertion module 36 and prior to attachment of the backer 202 and/or cover 802 to the web of label material 50 so that the material passing through the second die station 30*b* is of substantially uniform thickness.

An additional die station 30*c* is shown in the embodiment of system 10 of FIG. 1. Such additional die station 30*c* optionally may be adapted for specialty die cutting and punching operations. Other embodiments of system 10 may be adapted to include one or more additional optional die stations 30*c* to meet the die cutting and punching requirements, such as forming holes or apertures of a particular pro label book design.

In the embodiment of system 10 shown in FIG. 1, following die stations 30*a-c*, the web of label material 50 is fed through an optional waste removal station 32. If label cavities are die cut, the waste around the cavities can be peeled off of the web of label material 50 at a waste removal station 32 and then wound on a waste roll or sucked away by a vacuum. Waste removal station 32 is operable to remove all or substantially all of the portions of the label material component 212 of the web of label material 50 that are outside the boundaries of discrete labels affixed to the liner component 214 of the web of label material 50, while leaving the discrete labels affixed to the liner component 214 of the web of label material 50.

The web of label material 50 next passes through a turn bar 34 and then follows a web path 52 around the top of the backer/cover insertion module 36. If a cover 802 is to be inserted on the web of label material 50, the web of label material 50 is first turned over at turn bar 34, to orient the top of the web of label material properly to the back of the cover 802 at the cover insertion module 36. If a backer is to be inserted, the web of label material is not turned over by turn bar 34 so that the back of the web of label material (the liner material portion 212) is oriented to the front of the backer 202 at the backer insertion module 36.

The backer/cover insertion module 36 works in generally the same fashion regardless of whether it is operating as a cover insertion module (i.e. in a cover insertion mode) or a backer insertion module (i.e. in a backer insertion mode). Thus, for purposes of this disclosure the operation of the backer/cover insertion module 36 will be described with regard to its operation as a backer insertion module that attaches a backer 202 to the web of label material 50. Where the operation may be different when operating as a cover insertion module, that different operation will be described. Those skilled in the art, having been advised of the presence of the turn bar 34 will understand the operation of the backer/cover insertion module 36 when it operates to attach a cover 802 to a portion of the web of label material 50.

Additionally, while only a single backer/cover insertion module 36 is illustrated and described in the embodiment of system 10 shown in FIG. 1, it is within the scope of the disclosure for an additional backer/cover insertion module 36 (with or without an additional turn bar 34) to be added to system 10 so that both the backer 202 and the cover 802 may be applied to appropriate portions of the web of label material 50 prior to cutting the web into discrete label pages 701*a-e*. In such an embodiment, the optional backer/cover and stitcher module 48 may operate solely as a stitching module since both the backers 202 and covers 802 were attached to the web of label material 50 prior to cutting into discrete label pages 701*a-e*.

In the backer/cover insertion module 36, a roll of pre-printed or unprinted backer/cover material 54 is unwound from an unwind shaft 56. The web of backer/cover material 58 is transferred through a hot melt adhesive applicator 72, where a strip of hot melt adhesive is applied to the web of backer/cover material 58. In the backer insertion mode, the strip of adhesive may be of any width since the backer 202 is attached to the back of the liner material component 212 of the web of label material 50 underlying the discrete label that will be the last label page (701*e*) in the pro label book as long as it does not interfere with the position or function of die cuts on the liner. In the cover insertion mode, the strip of adhesive is applied to the stub area of the cover 802 and has a width less than or approximately equal to the stub area of the cover 802 so that the adhesive does not bind the cover 802 to the removable pressure sensitive label formed on the top label page 701*a* formed from the web of label material 50.

Figure 5:
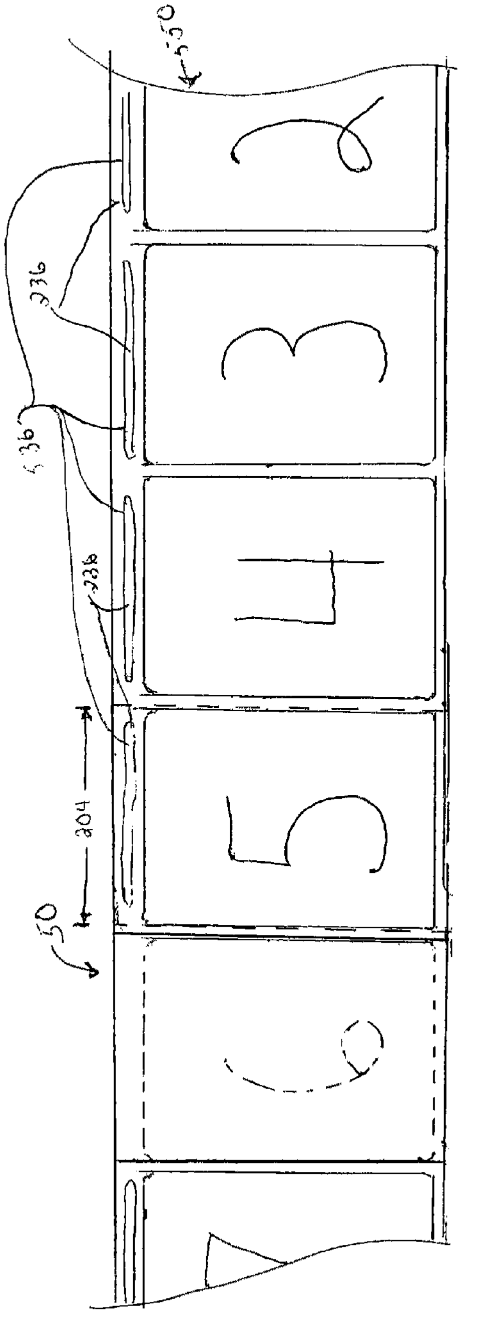
FIG. 5 is a simplified plan view of a web of label material that has had variable indicia printed on the face material and portions of the face material cut away and removed from the liner material, a backer attached to the back of the liner underlying the bottom label in the pro label book to be formed, a cover attached to the front face of the face of the label material overlying the top label in the pro label book to be formed and adhesive placed along the edge of the web material on the face of each label to be formed but not on the cover of the pro label book.
Figure 6:
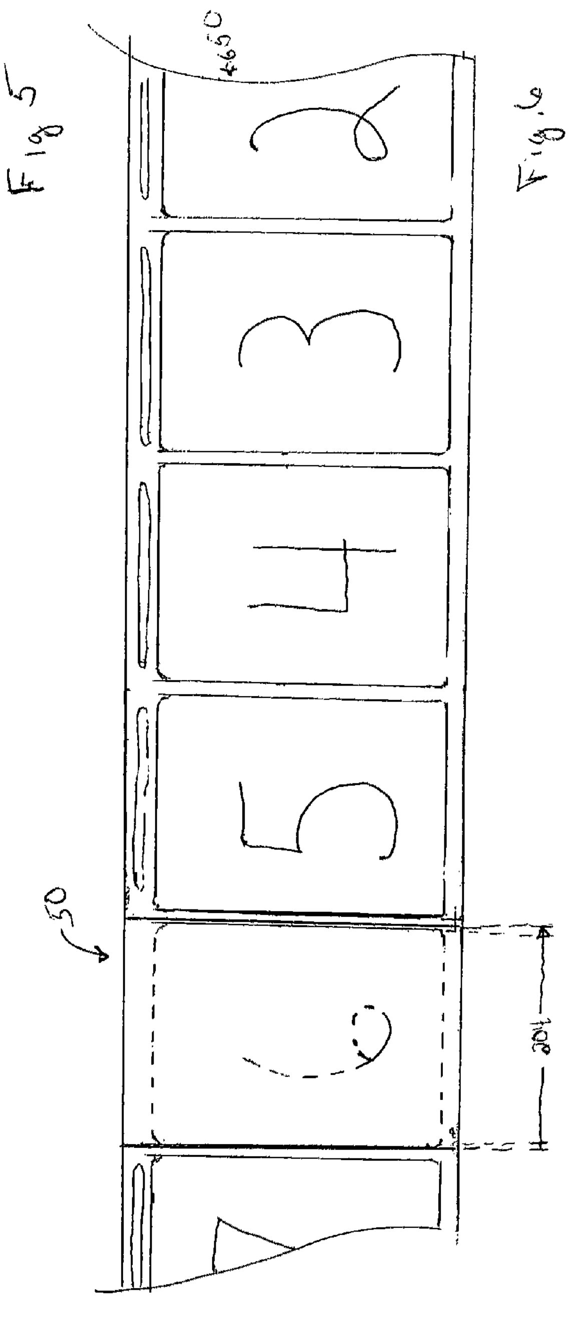
FIG. 6 is a simplified plan view of a web of label material that has had variable indicia printed on the face material and portions of the label sensitive material cut away and removed from the liner material, a cover attached to the front face of the liner overlying the top label in the pro label book to be formed and adhesive placed along the edge of the web material on the face of each label to be formed but not on the cover of the pro label book.

In one embodiment of the backer/cover insertion module 36, such as a module 36 utilized with a web of material 50 (such as shown in FIG. 2) that are split to form books, the adhesive applicator 72 applies adhesive to the cover 202 or backer 802 adjacent the top and bottom stub portions (similar to the manner in which the adhesive is shown as being applied to web 250 in FIG. 2) near the edges of the backer 202 or cover 802. In one embodiment of the backer/cover insertion module 36, such as a module 36 utilized with webs of material 50 (such as shown in FIG. 5, 6) that are not split to form books, the adhesive applicator 72 applies adhesive to the cover 202 or backer 802 adjacent the top stub portion (similar to the manner in which the adhesive is shown as being applied to web 550, 650 in FIGS. 5 and 6, respectively)' near the top edge of the backer 202 or cover 802. Alternatively, to more securely attach the cover 802 or backer 202 to the web of label material 50, adhesive may be applied to both the top edge and bottom edge of the cover 802 or backer 202. In subsequent operations, any undesirably adhered portion of the web and cover 802 and/or backer 202 may be trimmed prior to or at the time of forming the discrete label pages.

The backer 202 or cover 802 can be any length. It is generally the same size as the web of label material is wide.

Generally, as shown in phantom lines in FIGS. 7 and 8, the width 204 of the backer 202 is slightly less than the width 206 of the label pages 701*a-e* to be incorporated in the books 700, 800. Similarly the cover 802 has a width 204 as shown in FIGS. 8 and 9 that is slightly less than the width 206 of the label pages 701*a-e* to be incorporated in the books 800, 900. This discrepancy in widths 204 between the covers 802 and backers 202 and the width 206 of the individual label pages 701*a-e* is intentional as it allows the backer/cover insertion module 36 to attach the cover 802 or backer 202 in a position overlying or underlying, respectively, the appropriate portion of the web of label material 50 so as to be positioned entirely within the boundaries of that portion of the web that will be cut to form the discrete label pages 701*a* or 701*e*, respectively. Thus, when the web 50 is cut to form the discrete label pages 701*a* and 701*e*, the cover or backer material is not cut and no waste cover or backer material slivers are introduced into the manufacturing environment.

The width 204 of the backer or cover is determined by entering a number in the computer controller (which may be an onboard controller or may be a separate computer such as computer 60) of the backer/cover insertion module 36. The backer or cover web 58 is fed by feed rollers 62 at a rate of one backer 202 or cover 802 per quantity of labels per book 700, 800, 900 (e.g. For a book of twenty-five label pages—the width 204 of one backer 202 or cover 802 is fed from roll 54 every time the length of the label stock web 50 fed along the web path 52 is equal to the width 206 of twenty-five discrete label pages 701*a-e*). The backer web 58 is fed to adjacent a vacuum cylinder 64 that rotates with the direction of web motion. The vacuum cylinder 64 holds the backer 202 or cover 802 in place while a cutting cylinder 66 cuts the backer 202 or cover 802 from the web of backer/cover material 58. In one embodiment of the disclosed system 10, a silicone application roller is used on the knives of the cutting cylinder 66 to prevent the exposed hot melt adhesive from sticking to the knives. If the backer 202 or cover 802 is pre-printed, a sensor 68 is used to read the print position.

In one embodiment of the disclosed system 10, the backer/cover insertion module 36 is programmed to time the cut position of the cut cylinder 66 to the print position so that the print is in register as the covers 802 or backers 202 are cut from web 58. The vacuum cylinder 64 carries each cut-off backer 202 or cover 802 around to an impression roller 70 that the web of label material 50 wraps around. At this impression roller 70 the backer 202 or cover 802 is transferred from the vacuum cylinder 64 to the web of label material 50, in registered position on the back of the web of label material in a position underlying the portion of the web 50 that will become the bottom label page 701*e* of the book 700, 800 if it is a backer 202, or in registered position atop the web of label material 50 overlying the portion of the web of label material 50 that will become the top label page 701*a* of a pro label book 800, 900 if it is a cover 802. As it transfers off of the vacuum cylinder 64, the backer 202 or cover 802 is adhered to the label web 50 by the hot melt adhesive that was applied earlier at the adhesive applicator 72.

When it is desired to place the backer 202 or cover 802 relative to a specific sequential number (e.g. for books of twenty-five sheets, numbers ending in 00, 25, 50, and 75, or in the illustrated example for books of five sheets numbers ending in 00 or other numbers divisible by five) the computer controller 60 of the computerized variable printer (ink jet) 26 can be programmed to send an output signal to the computer controlled backer/cover insertion module 36, and the insertion module 36 will then cycle in time to the label with the specific sequential number. Digital registration adjustments in the computer programs for the computerized variable printer 26 and in the insertion module 36 facilitate initial set-up of the positioning of the backer 202 or cover 802 relative to the lead edge of the label and relative to the specific sequential number. This position is maintained and verified throughout the run by a registration sensor that reads a printed mark on the label web, and an encoder that communicates the press speed to the insertion module.

In one embodiment of the system 10, following insertion of the backer 202 or the cover 802, additional operations are performed on the web of label material to facilitate formation of a pro label book 700,800, 900. In the embodiment of system 10 shown in FIG. 1, a plurality of die cutting rotary die stations 38 are utilized to make additional cuts in the web of label material 50. Among the types of die cuts that may be performed are hole punching operations to facilitate attachments of pro label books to lanyards, clips or other carrying devices, trimming an edge of the web at which an adhesive was applied to a backer or cover in an area that would not become the stub, the formation of perforations, trim slitting, etc.

Since through cut die stations 38 may be configured to cut through the entire web of label material 50, in one embodiment of the system 10 and the method 1000, the die stations 38 are positioned in the path of the web 50 following to the backer/cover insertion module 36 since some die cut operations may be performed on materials having differing thicknesses. Additionally, some die cut operations are intended to cut the backer 202 and/or cover 802 in the same location as the labels.

In the embodiment of system 10 shown in FIG. 1, following die stations 38, the web of label material 50 is fed through an optional waste removal station 40. Waste along the edge of the web of label material 50 may be removed at the waste removal station 40 and then wound on a waste roll or sucked away by a vacuum.

In one embodiment of system 10, such as one utilized with a web of label material 250 as shown in FIG. 2, following the waste removal station 40, the web of label material 250 is fed through an optional slitter station (not shown) of a well known configuration. Slitter stations may be used where the web of label material 250 is configured so that a plurality of streams of discrete labels are arranged across the width of the web of label material 250, as shown, for example, in FIG. 2. The web of label material 50, including the discrete labels affixed thereto, may be slit into individual streams of discrete labels at the slitter station in a well known manner. In other embodiments of the system for manufacturing pro label books, the optional slitter station may be positioned in other appropriate locations within the system. As described above, the slitting operation may be performed by one of the through cut rotary die stations 38 eliminating the need for an optional dedicated slitter station.

In the embodiment of system 10 shown in FIG. 1, the web of label material may be fed through an adhesive application station or applicator 42. In one embodiment of the disclosed system the adhesive applicator 42 is controlled by a computerized timer, which is programmed to apply a patterned length of adhesive or adhesive application 236 on the web of label material 50 in the stub area of all label sheets 701 to be formed and included in the label book except for the top page 701*a* or the cover 802. The patterned length of adhesive 236 may be discontinuous length of adhesive 536, as shown for example in FIGS. 5, 6, or may be a continuous length of adhesive, as shown for example, in FIG. 2, within the scope of the disclosure.

The length of this adhesive application 236 on the moving web determines the quantity of sheets per book. For example, for a label book with twenty-five sheets 701 each sheet having a nominative width 206 of two inches, two inches of web material (that portion on which the top label page 701*a* is formed (with or without an overlying attached cover 802) are allowed to pass through the adhesive applicator 42 without any adhesive being applied, then the adhesive applicator 44 applies the adhesive application 236 to the next forty-eight inches of web material 50. Then the process is repeated.

In the course of sheeting and stacking the labels, a consecutive label will automatically be adhered atop each label that had adhesive applied by the adhesive applicator 42. Thus, for example, one label sheet 701*a* (the first label sheet 701 in a first label book with or without a cover attached thereto and without adhesive applied) adhered atop twenty-four label sheets 701 with adhesive results in a pro label book including twenty-five label sheets 701. Since the twenty-sixth label sheet (the first label sheet 701*a* in a second twenty-five sheet pro label book) or the cover adhered thereto has no adhesive applied atop, this creates a breaking point between pro label books every 25th sheet.). Thus, the quantity of sheets per book can be adjusted in any increment based on the setting for the length of the pattern of adhesive to be applied to the web of material 50 by the adhesive applicator 42. Thus, the disclosed system and method, via adhesive application to the web of label material, automates the batching process for forming the completed pro label books.

In one embodiment of the disclosed system 10, the position of the adhesive application 236 on the web of label material 50 by the adhesive applicator 42 is adjustable by digital settings in a computerized timer (not shown) that controls the adhesive applicator 42. The adhesive application 236 is positioned so that the adhesive applicator 42 does not apply adhesive on the top sheet (possibly including the cover 802 if one was inserted earlier) of any pro label book to be formed from the web of label material 50.

In one embodiment of the disclosed system and method, when a backer 202 is inserted on the web of label material 50, the adhesive pattern is positioned so that it terminates at the end of the portion of the web 50 that will form the label sheet to which the backer 202 is attached, so that sheet becomes the bottom of the book after sheeting, and terminates at the portion of the web of label material that will form the second label sheet of the pro label book to be formed, i.e. the portion of the web that will become the top label page or a cover overlying that page does not receive adhesive. In one embodiment of the disclosed system and method, the starting point of the adhesive pattern is triggered by a sensor (not shown) that reads a printed mark 240 (see, for example, FIG. 2) on the web label material 50 which mark 240 maybe printed by a static printer 16, 18, 20, 22, 28 or by the computerized variable printer 26. In one embodiment of the disclose, or by an output signal sent directly from the computerized variable printer to the computerized timer for the adhesive applicator.

Following the adhesive application station 42 the web of label material 50 looking like a portion of web 250 or web 550, 650 is fed through an sheeter station 44. In at least one embodiment of a system 10 according to the present disclosure for automated production of pro label books, the web of label material 50 may be finished by shearing, at sheeter 44, the web of label material 50 into discrete label sheets or pages 701*a-e* (see for example, FIGS. 7-9), including the discrete labels affixed thereto. While FIGS. 7-9 show label books 700, 800, 900 including only five discrete sheets 701*a-e*, those skilled in the art will recognize that pro label books may include any number of discrete sheets within the scope of the disclosure. Many common pro label books include ten, twenty-five, fifty or one hundred discrete sheets.

In one embodiment of the system 10, an optional stitcher backer/cover inserter 48 is provided following the stacker 46. In at least one embodiment of a system 10 according to the present disclosure for automated production of pro label books, if a backer 202 or cover 802 was attached by a single backer/cover insertion module 36 and a second insertion module is not provided for attachment of an additional cover 802 or additional backer 202 to the web of label material 50 and a pro label book such as book 800 including both a backer 202 and cover 802 are to be formed, optional stitcher backer/cover inserter 48 inserts the additional cover 802 or additional backer 202 prior to stitching (stapling) the book together along the stub.

When the optional stitcher backer/cover inserter 48 is provided in system 10, the pro label books may be stapled in the stub area using an automated rotary stitching system or straight conveyor belt stitching system. Since a single backer cover inserter 48 is capable of inserting either a cover 802 or a backer 202 onto the book in-line in one pass, if both a cover 802 and a backer 202 are required, one of those items may be inserted using one of these automated stitching lines. In such a situation, pro label books are loaded into a magazine, hopper, or feeder either automatically in-line or manually. Backers and/or covers 802 are placed into feeders. In one embodiment of the disclosed system 10 and method 1000, a backer 202 is inserted into a nest by a feeder when the pro label book 800 had a cover 802 attached by the backer/cover insertion module 36 and the pro label book is mechanically removed from the bottom of a hopper or magazine of the stitcher 48 and inserted into the nest by a feeder on top of the backer 202. In one embodiment of the disclosed system 10 and method 1000, when the pro label book 800 to be formed had a backer 202 attached by the backer/cover insertion module 36, the pro label book is mechanically removed from the bottom of a hopper or magazine of the stacker 46 and inserted into the nest by a feeder, a cover 802 is then inserted on top of the book in the nest by the feeder. In either of the two above described embodiments, one or multiple staples are stitched into the pro label book 800 at the stitching station 48, and optionally second staple or multiple staples are stitched into the book at a stitching station.

A pro label book with the cover 802 and/or the backer 202 omitted may also be formed using the system 10 and method with the stitching module 48. Optionally a backer can be inserted into a nest then a pro label book can be inserted into a nest, then optionally a cover can be inserted into a nest then one or multiple staples are stitched into the pro label book at the stitching station 48, and optionally a second staple or multiple staples are stitched into the pro label book at the stitching station 48 within the scope of the disclosure.

System 10 of FIG. 1 represents merely an exemplary embodiment of a system according to the present disclosure for automated production of pro label books. For example, although two variable printers 26 are shown in the embodiment of system 10 shown in FIG. 1, the present disclosure is not limited to systems comprising two variable printers. Other embodiments of systems according to the present disclosure may comprise more than or less than two variable printers.

Also, for example, many embodiments of systems, methods, and labels disclosed herein discuss labels comprising pressure sensitive label material. Labels and tags that do not comprise pressure sensitive label material, and systems and methods related to the same, are within the scope of the present disclosure. For example, in lieu of a liner-backed label, a label according to at least one embodiment of the present disclosure may comprise a layer backed with a dry gum adhesive or another form of adhesive. Each such embodiment of a label is within the scope of the present disclosure.

In one embodiment of a method 1000 of manufacturing pro label books, the pro label books are manufactured, including batch counting, attaching of a backer or a cover 802, and binding in a stub area, in one pass on a 5 color rotary flexographic label press with multiple flexo printheads, rotary die cutting stations, optional waste matrix removal, a computerized variable printer, a computer controlled backer/cover insertion module, multiple adhesive applicators, and a starwheel stacker.

One embodiment of the disclosed method 1000 of manufacturing pro label books, as shown for example, in FIG. 10 includes a plurality of steps, many of which may be performed in various orders, but some of which are necessarily performed in a specific order relative to others of which. Each of the described steps may include additional component steps. Some of the described steps are optional and may be omitted from the process 1000.

In step 1010 of FIG. 10, variable indicia is printed on a roll or web of label material, which may be a liner-backed label material. In step 1020 of FIG. 10, static indicia is printed on the web of label material. In one embodiment of the disclosed method 1000, the printing static indicia step 1020 is performed utilizing a printing device that relies upon the material to be printed upon to be of substantially uniform thickness, such as, for example, a flexo-graphic printhead.

In step 1030, portions of the web of label material are die cut to form distinct labels. In one embodiment of the disclosed method 1000, the die cutting is performed utilizing a device that relies upon the material to be cut to be of substantially uniform thickness in order to cut the material to the desired depth, such as, for example, a rotary die cutting station. Step 1030 may include the further step of removing waste around the cuts performed.

Steps 1010, 1020, 1030 generally may be performed in any order relative to each other so as to provide the labels to be formed with the appearance desired by a customer. Thus, steps 1010, 1020, 1030 are included in a step 1005 which includes processes typically to be performed prior to the attaching a backer or cover to the web of label material step 1040. Steps 1010, 1020 and 1030 are performed on a web of label material and thus, step 1005 includes the sub-step of providing a web of label material. The sub-step of providing a web of label material may include the further sub-steps of providing a web of paper free of adhesive and providing a web of liner material, coating adhesive on the paper or liner and laminating the paper to the liner to form a web of label material.

Typically the printing static indicia step 1020 is performed prior to the printing variable indicia step 1010 since variable indicia is often printed on top of static indicia (e.g. serial numbers on a colored background). While the printing variable indicia step is typically performed prior to the attaching a backer or cover step, in certain embodiments of the disclosed method, the entire or portions of the printing variable indicia step may be performed following the attaching a backer or cover to the web of label material step 1040 since many variable printers do not require that the material to be printed upon be of uniform thickness. The printing variable indicia step may include the sub-step of printing a registration mark on the web of label material which registration mark is sensed to facilitate attachment of the backer or cover in an appropriate location to the web of label material in step 1040 and/or to trigger the beginning of the application of an adhesive to the web of label material in step 1050.

The provided web of label material may be pressure sensitive (PS) label stock for the label sheets. Optionally, any material may be substituted for the PS label stock to manufacture books with sheets of other types of numbered products, such as tags.

Optionally, specially constructed label material can be used to facilitate an adhesive bound stub that does not require staples to hold the book together. This label stock is constructed with a void of silicone on the liner portion of the label stock in the stub area of the book, so that the face is bonded to the liner in that area. When the sheets are glued together in this stub area as described herein, the book is permanently bonded together with adhesive, and staples are not required to hold the sheets. Without this specially constructed PS label stock and without staples, the adhesive bound label book may fall apart because the face stock of any label within the book can separate from the silicone liner in the glue stub area.

Optionally, a different specially constructed label stock, with no silicone liner and no PS adhesive coated on the back of the face paper in the stub area, can be used to facilitate an adhesive bound stub that does not require staples to hold the book together. Thus the stub consists only of the face paper of the PS label stock. As described in the manufacturing process, when adhesive is applied in the stub area and the labels are sheeted and stacked, the adhesive bonds each layer of face paper to permanently bind the book. This type of label stock can be furnished to the press pre-manufactured or it can be manufactured in-line on the press using face paper such as 20# bond, silicone liner on an additional unwind, and a hot melt coating and laminating system to coat hot melt adhesive atop the silicone liner and laminate it to the back of the face paper.

In step 1040, a backer or cover is attached to an appropriate location on the web of label material. The attaching a backer or cover step 1040 may include the sub-steps of turning the web of label material over prior to attaching the cover or backer, providing a web of tag stock, applying an adhesive to the tag stock, cutting the tag stock to form a cover or backer, determining when the desired location on the web of label material for placement of the cover or backer will be at an attachment location, and attaching the cover or backer in the desired location on the web of label material. Optionally any material may be substituted for tag stock for the cover or backer.

In step 1050, adhesive is applied to the web of label material. The applying an adhesive to the web of label material step may include the sub-steps of applying adhesive only on portions of the web that will become pages other than the top page of a label book, applying adhesive only to portions of the web that will become stub areas of label pages of the pro label book, applying the adhesive in a continuous strip extending between the portion of the web that will become the last page of a label book and the portion of the web that will become the second page of a label book, and applying the adhesive in a discontinuous strip extending between the portion of the web that will become the last page of a label book and the portion of the web that will become the second page of a label book.

In step 1060, the web is cut to form pages of a pro label book. In one embodiment of the disclosed method 1000, the cutting the web step may include cutting the web using a sheeter device. Optionally, in at least one embodiment of method 1000 for automated production of pro label books according to the present disclosure, the web of label material 50 may be finished in step 1060 by cutting perforations between discrete labels at sheeter station 44.

In step 1070 the pages of the pro label book are joined together to form a pro label book. In one embodiment of the disclosed method 1000, step 1070 includes the steps of stacking the pages formed in step 1060 on their sides and pressing them together to enable the adhesive applied in step 1050 to join the sheets together in batches with each batch including a pro label book. In one embodiment of the disclosed method 1000, step 1070 includes the step of stitching the pages formed in step 1060 to form a pro label book. In one embodiment of the disclosed method 1000, step 1070 includes the steps of stacking the pages formed in step 1060 on their sides and pressing them together to enable the adhesive applied in step 1050 to join the sheets together in batches with each batch including a substantial portion of a pro label book, inserting a cover overlying the first page of each substantial pro label book and stitching the cover and pages together. In one embodiment of the disclosed method 1000, step 1070 includes the steps of stacking the pages formed in step 1060 on their sides and pressing them together to enable the adhesive applied in step 1050 to join the sheets together in batches with each batch including a substantial portion of a pro label book, inserting a backer underlying the last page of each substantial pro label book and stitching the backer and pages together. Optionally, in at least one embodiment of method 1000 for automated production of pro label books according to the present disclosure, wherein the web of label material 50 has be finished by cutting perforations between discrete labels at sheeter station 44, step 1070 includes stacking the labels to form a pro label book.

According to one aspect of the disclosed system 10 and method 1000, booklets are printed and bound in a highly efficient manner utilizing substantially less labor than other processes to batch small counts of pages into booklets (generally 25 or 50 pages per book but capable of any page count). The pages of the booklets can be made of any substrate, including paper, tag stock, film, pressure sensitive label material, etc. The pages may contain static printing (such as logos, instructions, etc.), variable printing (such as bar codes, names, etc.), both static and variable printing, or no printing. Each page may contain one or more die-cut labels. Types of booklets include, but are not limited to, pro-label books, inventory tracking label books, etc. One embodiment of the disclosed system 10 and method may be utilized to assemble and stitch approximately one booklet per second. The size of the booklet is generally relatively small, sizes are typically, but not limited to, approximately 2" to 4" wide, 4" to 9" long, and 1/16" to 3/4" thick.

The pages of the booklets are printed, die cut, cut to size, and bound with adhesive in a stub area as described above. In certain embodiments of the system and method, the backer and cover insertion steps and modules and any limitations they impose on the process may be omitted from this booklet assembly and stitching binding process, however, in this embodiment, a rotary booklet assembly and stitching machine 1100 is utilized as the stitching module 48 to assemble and stitch the booklets. One embodiment of the rotary booklet assembly and stitching machine 1100 is capable of booklet assembly including a cover, the pages, a backer, and staples, at a target rate of approximately one booklet per second.

As described above, the adhesive bound booklet manufactured utilizing one embodiment of the disclosed system 10 and method 1000, prior to processing in the rotary booklet assembly and stitching machine 1100, has an adhesive binding that is vulnerable to being torn apart relatively easily by a person, so it is most often advantageous to further bind the booklet with one or more staples in the stub area. The rotary booklet assembly and stitching machine 1100 facilitates the stapling process, at a target rate of one book per second, but the speed is adjustable.

One embodiment of a rotary booklet assembly and stitching machine 1100 has four material feed stations 1102, 1104, 1106, 1108, two stitching stations 1110, 1112, eight assembly nests 1114, 1116, 1118, 1120, 1122, 1124, 1126, 1128 on a rotary table 1130, and a stacking station 1132 for the finished booklets. Other embodiments of rotary booklet assembly and stitching machines 1100 may include more or fewer nests and stations of any type within the scope of the disclosure.

In the illustrated embodiment, three of the feed stations 1102, 1104, 1106 are designed for automatic feeding of sheets or adhesive bound booklets, and have mechanical feeders 1142, 1144, 1146 installed, while one of the feed stations 1108 is designed for manual feeding of sheets or adhesive bound booklets, so it has no mechanical feeder installed. In the drawing, the manual feed station 1108 is one station to the left of first mechanical feeder 1102. Those skilled in the art will recognize that other embodiments of a rotary booklet assembly and stitching machine 1100 may include all automated feed stations or different numbers of automated and manual feed stations.

In the illustrated machine 1100, at the manual feed station 1108, as an alternate to adhesive bound booklets, batched quantities of booklet pages that are not previously bound with adhesive may be inserted manually into the nests 1114, 1116, 1118, 1120, 1122, 1124, 1126, 1128 on the rotary table 1130. Another alternative to furnishing adhesive bound booklets to a nest 1114, 1116, 1118, 1120, 1122, 1124, 1126, 1128 is to program one of the feeders 1142, 1144, 1146 to feed a programmed quantity of individual sheets into the nest 1114, 1116, 1118, 1120, 1122, 1124, 1126, 1128 each time that the rotary table 1130 is in the feed mode of its cycle.

Into the mechanical feeders 1142, 1144, 1146 can be inserted covers, backers, and adhesive bound booklets. Each mechanical feeder 1142, 1144, 1146 has a hopper 1152, 1154, 1156 in which one type of booklet component (covers, backers, or booklets) is stacked. These hoppers 1152, 1154, 1156 are adjustable to accommodate covers, backers, and adhesive bound booklets of various lengths and widths from one job to the next. The feeders 1142, 1144, 1146 are adjustable and versatile, so each feeder 1142, 1144, 1146 can feed any of the components. This allows different combinations of assembly order. For example, two different backer sheets could be assembled on the bottom of a booklet with no cover, by setting up the first two feeders 1142, 1144 with backers and the last feeder 1146 with booklets. In another example, two different types of adhesive bound booklets could be bound together with a cover by setting up the first two feeders 1142, 1144 for booklets and the last feeder 1146 for covers. Further, by using the manual feed station 1108, four types of inputs could be assembled, and a wide variety of assembly combinations are achievable. Conversely, any feeder 1142, 1144, 1146 can be turned off if not needed for the booklet being manufactured, allowing assembly of fewer components. For example, an adhesive bound booklet can have staples added by the rotary booklet assembly and stitching machine 1100 with no cover or backer.

Figure 12:
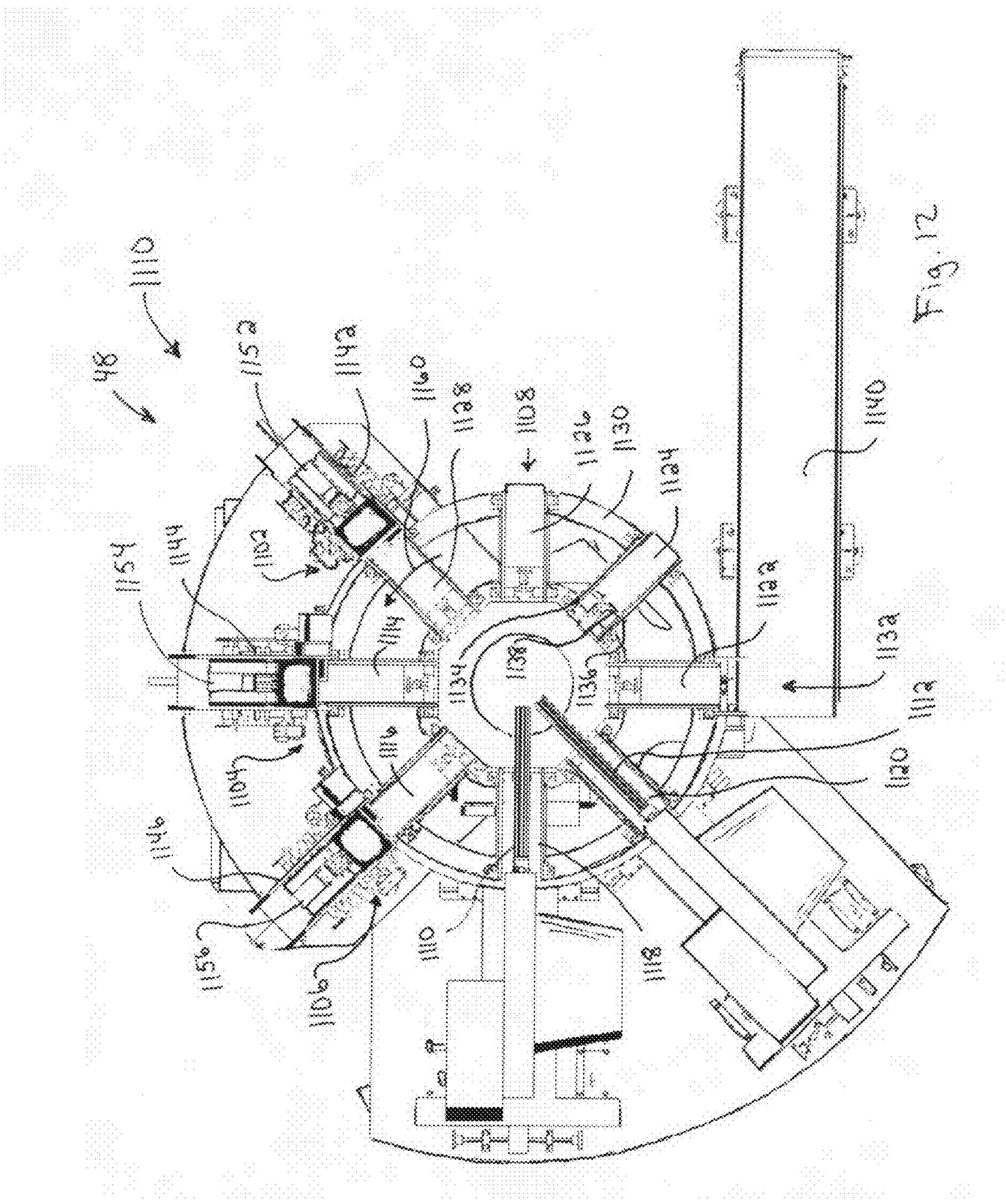
FIG. 12 is a plan view of the rotary assembly and stitching machine of FIG. 11.
Figure 13:
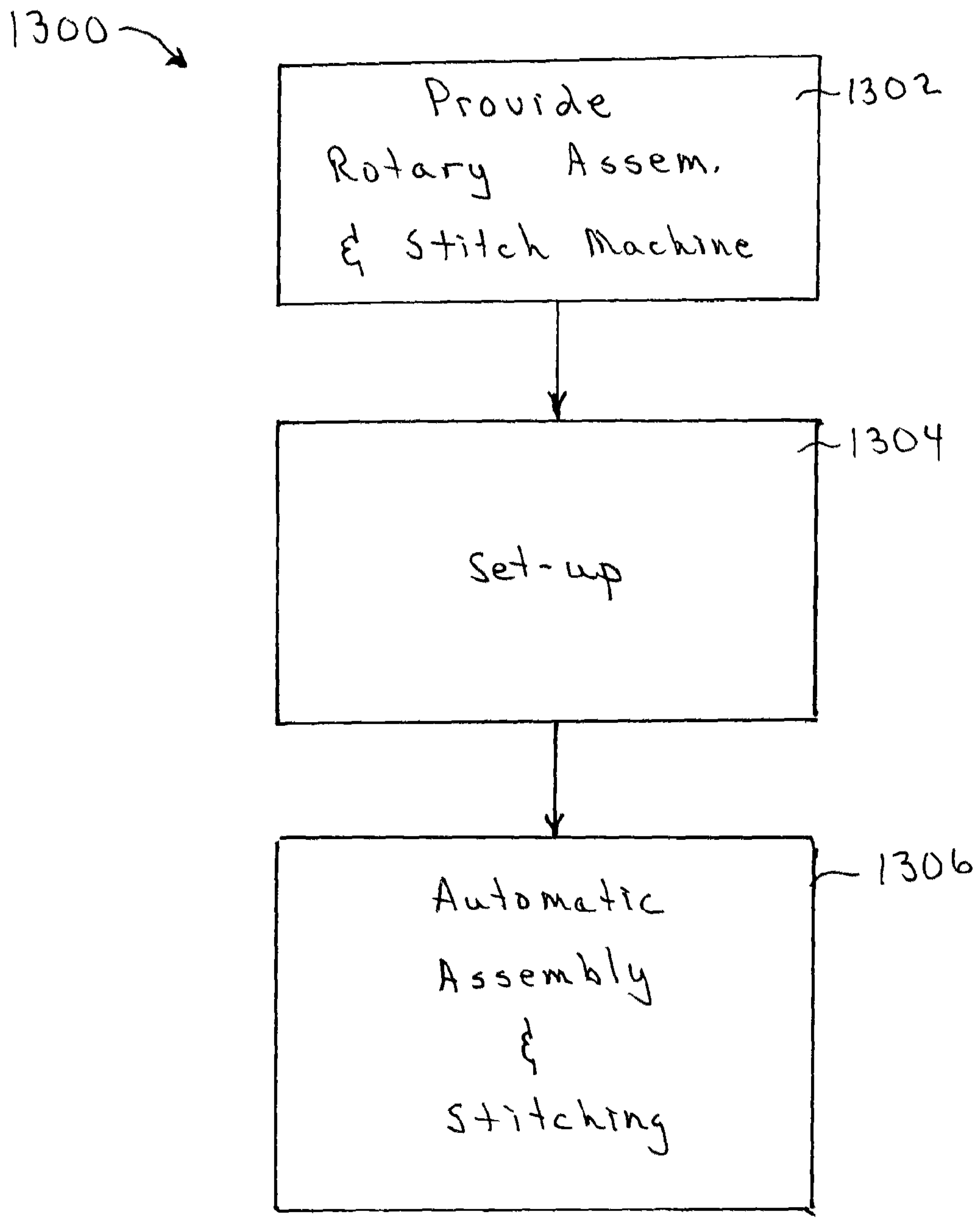
FIG. 13 is flow diagram of the stitching step when a rotary assembly and stitching machine is utilized in assembling a booklet.

The illustrated embodiment of the rotary booklet assembly and stitching machine 1100 has a rotary indexing table 1130 containing eight adjustable nests 1114, 1116, 1118, 1120, 1122, 1124, 1126, 1128. The nests 1114, 1116, 1118, 1120, 1122, 1124, 1126, 1128 have three guide plates 1134, 1136, 1138 (numbered in FIG. 12 with regard to nest 1124 only). Two are side-plates 1134, 1136 that are spaced apart approximately the same width as the booklet, and they serve to align the covers, booklets, and backers within the nest. The third plate is a back-stop plate 1138. This plate 1138 serves to position the booklet, cover, and backer lengthwise in the nest 1114, 1116, 1118, 1120, 1122, 1124, 1126, 1128, so that it is aligned in a way that the stub is in correct position relative to the stitchers. These nests 1114, 1116, 1118, 1120, 1122, 1124, 1126, 1128 are adjustable to facilitate receiving covers, backers, and adhesive bound booklets of various lengths and widths from one job to the next. Assembly and alignment of the components of the booklet occur inside these nests 1114, 1116, 1118, 1120, 1122, 1124, 1126, 1128, and alignment of each booklet, cover, and backer is facilitated by the positioning of these guides 1134, 1136, 1138.

One embodiment of the rotary indexing machine 1100 is programmed to cycle at a rate that is adjustable by the machine operator, with a target rate of one book per second. In the process of cycling, the rotary table 1130 will rotate at high speed, but it will stop approximately once per second, for approximately one second, with one nest 1114, 1116, 1118, 1120, 1122, 1124, 1126, 1128 in precise alignment with each feed station 1102, 1104, 1106, 1108 and each stitching station 1110, 1112, and the stacking station 1132. The nests 1114, 1116, 1118, 1120, 1122, 1124, 1126, 1128 are spaced apart from each other in precise position around the rotary table 1130 so that each time the rotary table 1130 stops each nest 1114, 1116, 1118, 1120, 1122, 1124, 1126, 1128 is in the same precise position relative to each feeder 1102, 1104, 1106, 1108 and each stitcher 1110, 1112, allowing for precise alignment of the nests 1114, 1116, 1118, 1120, 1122, 1124, 1126, 1128 with the feeders 1102, 1104, 1106, 1108, and allowing for precise positioning of the product relative to the stitchers 1110, 1112. The feeders 1102, 1104, 1106, 1108 are spaced precisely around the rotary table 1130 so that the center of each feeder 1102, 1104, 1106, 1108 is aligned precisely to the center of each nest 1114, 1116, 1118, 1120, 1122, 1124, 1126, 1128 when the rotary table 1130 is in the stopped position. The position of the stitchers 1110, 1112 are adjustable relative to the nests 1114, 1116, 1118, 1120, 1122, 1124, 1126, 1128, to allow positioning of the staples anywhere in the stub of the booklet.

The mechanical feeder 1102, 1104, 1106 selects one sheet or booklet (if present therein) at a time from the bottom of the stack in its hopper 1152, 1154, 1156 and feeds it into a nest 1114, 1116, 1118, 1120, 1122, 1124, 1126, 1128 on a rotary table 1130. The length-wise position of the booklet, cover, or backer within in the nest 1114, 1116, 1118, 1120, 1122, 1124, 1126, 1128 is controlled by the adjustable back-stop plate 1138 of the nest 1114, 1116, 1118, 1120, 1122, 1124, 1126, 1128. If the manual feed station 1108 is used, a person inserts the sheet, sheets, or adhesive bound booklet into the nest 1114, 1116, 1118, 1120, 1122, 1124, 1126, 1128. While the rotary table 1130 is in the stopped position of each cycle, each feeder 1142, 1144, 1146 feeds a piece into the nest 1114, 1116, 1118, 1120, 1122, 1124, 1126, 1128 that is stopped at its station 1102, 1104, 1106, and if there is a piece in the nest 1114, 1116, 1118, 1120, 1122, 1124, 1126, 1128 at the stitching station 1110, 1112, the stitcher 1110, 1112 will place a staple in the booklet. After the stitching stations 1110, 1112 have bound a booklet with staples, the rotary table 1130 moves the booklet to the stacking station 1142, where a set of feed rollers grips the booklet and moves it to a stacking conveyor 1140 where they are stacked one atop another in shingled fashion.

According to one embodiment of a method of assembling booklets 1300, a rotary booklet assembly and stitching machine is provided 1302. The provided machine is set-up 1304. In the described embodiment, it will be assumed that a twenty five page bar coded pro label book with a cover and backer is to be assembled and stitched with two staples, but those skilled in the art will recognize that other types of booklets with more or fewer pages and/or with one or both of the cover and backer deleted and/or with more or fewer staples may be formed. The provided machine is set-up for the desired booklet configuration. This may include stopping the provided machine and positioning they nests 1114, 1116, 1118, 1120, 1122, 1124, 1126, 1128 in alignment with each of the feed stations 1102, 1104, 1106, 1108, stitching stations 1110, 1112, and stacking station 1132. The set-up step 1304 may further include the step of loosening hold down screws and adjusting the side plates 1134, 1136 of every nest 1114, 1116, 1118, 1120, 1122, 1124, 1126, 1128 manually to the width of the booklet, and to center the booklet in the nest 1114, 1116, 1118, 1120, 1122, 1124, 1126, 1128 relative to the feeders 1142, 1144, 1146. The set-up step may also include the step of adjusting in a similar fashion the back-stop plate 1138 to the length of the booklet to position the stub area relative to the stitchers 1110, 1112. During the set up step, the rotary table 1130 may be manually indexed to locate each nest 1114, 1116, 1118, 1120, 1122, 1124, 1126, 1128 at the manual feed station 1108 to allow access to the nests to make these adjustments. The set-up step 1304 may also include manually adjusting the hoppers 1152, 1154, 1156 of each feeder 1142, 1144, 1146 to the length and width of the booklet, cover, and backer.

In one embodiment of the method during the set-up step 1304, backers are inserted into the hopper 1152 of the first mechanical feeder 1142. While the illustrated machine requires that the backers be inserted into the hopper 1152 manually during the set-up step 1304, it is within the scope of the disclosure for a feed mechanism to automatically insert backers into the hopper 1152. A backer (or more if multiple backers are desired for some reason) is fed from the first mechanical feeder 1142 into each nest 1114, 1116, 1118, 1120, 1122, 1124, 1126, 1128 as the nest 1114, 1116, 1118, 1120, 1122, 1124, 1126, 1128 is positioned adjacent the mechanical feeder 1142. In one embodiment during the set-up step 1304, a machine operator manually feeds a backer into the nest 1114, 1116, 1118, 1120, 1122, 1124, 1126, 1128 by pressing the manual feed button on the mechanical feeder 1142. The description of the set-up step 1304 will continue describing steps and operations as being performed manually by a machine operator, however, those skilled in the art, will recognize that such steps may be automated within the scope of the disclosure.

The rotary table 1130 is indexed. In one embodiment, the machine operator manually indexes the rotary table 1130, for example, by pressing the index button on a touch screen control, which then causes each nest 1114, 1116, 1118, 1120, 1122, 1124, 1126, 1128 to rotate counter clockwise (as shown by arrow 1160 in FIG. 12), resulting in the backer being present in the nest 1114, 1116, 1118, 1120, 1122, 1124, 1126, 1128 positioned in front of the second feeder 1144, and another backer being automatically inserted into the nest 1114, 1116, 1118, 1120, 1122, 1124, 1126, 1128 positioned in front of the first feeder 1142. Continuing the set-up step 1304, the machine operator inserts adhesive bound booklets into the hopper 1154 of the second mechanical feeder 1144, and manually feeds an adhesive bound booklet into the nest 1114, 1116, 1118, 1120, 1122, 1124, 1126, 1128 positioned adjacent the second feeder 1144 by pressing the manual feed button on the mechanical feeder 1144. As a result, there is now a backer and an adhesive bound booklet in the nest 1114, 1116, 1118, 1120, 1122, 1124, 1126, 1128 in front of the second feeder 1144. Alternatively, the machine operator may insert unbound sheets of bar coded labels into the hopper 1154 of the second mechanical feeder 1144 and program the feeder 1144 to feed a quantity of sheets (for example twenty-five) every time that the feeder 1144 is called on to operate, and presses the manual feed button on the mechanical feeder 1144. As a result there are now a backer and twenty-five label sheets in the nest 1114, 1116, 1118, 1120, 1122, 1124, 1126, 1128 in front of the second feeder 1144.

Continuing the set-up step 1304, the machine operator again manually indexes the rotary table 1130 by pressing the index button on the touch screen control, which again causes each nest 1114, 1116, 1118, 1120, 1122, 1124, 1126, 1128 to rotate counter clockwise, resulting in the backer and adhesive bound booklet being present in the nest 1114, 1116, 1118, 1120, 1122, 1124, 1126, 1128 positioned in front of the third feeder 1146, another backer and an adhesive bound booklet in the nest 1114, 1116, 1118, 1120, 1122, 1124, 1126, 1128 in front of the second feeder 1144, and another backer being inserted into the nest 1114, 1116, 1118, 1120, 1122, 1124, 1126, 1128 positioned in front of the first feeder 1142. The machine operator inserts covers into the hopper 1156 of the third mechanical feeder 1146, and manually feeds a cover into the nest 1114, 1116, 1118, 1120, 1122, 1124, 1126, 1128 by pressing the manual feed button on the mechanical feeder 1146. As a result, there is now a backer, an adhesive bound booklet, and a cover in the nest 1114, 1116, 1118, 1120, 1122, 1124, 1126, 1128 in front of the third feeder 1146.

The set-up step 1304 continues with the machine operator again manually indexing the rotary table 1130 by pressing the index button on the touch screen control, which again causes each nest 1114, 1116, 1118, 1120, 1122, 1124, 1126, 1128 to rotate counter clockwise, resulting in a backer, adhesive bound booklet, and cover being present in the nest 1114, 1116, 1118, 1120, 1122, 1124, 1126, 1128 positioned in front of the first stitcher 1110, another backer, adhesive bound booklet, and cover in the nest 1114, 1116, 1118, 1120, 1122, 1124, 1126, 1128 in front of the third feeder 1146, another backer and adhesive bound booklet being present in the nest 1114, 1116, 1118, 1120, 1122, 1124, 1126, 1128 in front of the second feeder 1144, and another backer being inserted into the nest 1114, 1116, 1118, 1120, 1122, 1124, 1126, 1128 positioned in front of the first feeder 1142. One staple is stitched into the stub area of the booklet in the nest 1114, 1116, 1118, 1120, 1122, 1124, 1126, 1128 in front of the first stitcher 1110. The stitcher 1110 can be moved sideways relative to the nest 1114, 1116, 1118, 1120, 1122, 1124, 1126, 1128 to adjust the side to side position of the stitch in the stub area of the booklet.

Continuing the setup step 1304, the machine operator again manually indexes the rotary table 1130 by pressing the index button on the touch screen control, which again causes each nest to rotate counter clockwise, resulting in the booklet with one staple moving to the second stitcher 1112 and receiving a second staple. As described in previous steps, each feed 1102, 1104, 1106 and stitching station 1110, 1112 operates during this cycle to service the nest 1114, 1116, 1118, 1120, 1122, 1124, 1126, 1128 in front of it. The second stitcher 1112 can be moved sideways relative to the nest 1114, 1116, 1118, 1120, 1122, 1124, 1126, 1128 to adjust the side to side position of the second stitch in the stub area of the booklet.

Continuing the set-up step 1304, the machine operator again manually indexes the rotary table 1130 by pressing the index button on the touch screen control, which again causes each nest 1114, 1116, 1118, 1120, 1122, 1124, 1126, 1128 to rotate counter clockwise, resulting in the booklet with two staples becoming present in the stacking station 1132 where two feed rollers grip the booklet, pull the booklet out of the nest 1114, 1116, 1118, 1120, 1122, 1124, 1126, 1128, and deposit the booklet on a straight conveyor 1140 where subsequent books will be stacked in shingled fashion. As described in previous steps, each feed 1102, 1104, 1106, 1108 and stitching station 1110, 1112 operates during this cycle to service the nest 1114, 1116, 1118, 1120, 1122, 1124, 1126, 1128 in front of it.

The steps performed manually or with manual intervention in the set-up step 1304 are steps to fill the feeders and nests with the initial product. Other than the adjusting of the nests steps and the filling the hopper steps, these same steps are performed automatically with each cycle of the machine, further described below. Thus, once the set-up step 1304 is completed, the operator presses the run button on the touch screen control to put the machine in automatic cycle mode to perform and automatic assembly and stitching step 1306. One embodiment of the machine 1100 will index at the rate of approximately one cycle per second. This rate is adjustable. As described above previously in manual mode, now automatically every time the machine 1100 cycles, the rotary table 1130 of nests 1114, 1116, 1118, 1120, 1122, 1124, 1126, 1128 rotates counterclockwise and stops with the nests 1114, 1116, 1118, 1120, 1122, 1124, 1126, 1128 in precise alignment with the feed stations 1102, 1104, 1106, 1108, stitching stations 1110, 1112, and stacking station 1132, and each of those stations 1102, 1104, 1106, 1108, 1110, 1112, 1132 performs its previously described function simultaneously. Once each station 1102, 1104, 1106, 1108, 1110, 1112, 1132 has completed its function, the rotary table 1130 indexes, stops in precise position, and again all stations 1102, 1104, 1106, 1108, 1110, 1112, 1132 perform their functions simultaneously. Assembled booklets accumulate in shingled fashion on the conveyor 1140 of the stacking station 1132, and are picked up by a person to be packaged. The machine operator manually loads the hoppers 1152, 1154, 1156 with additional booklets, covers, and backers while the machine 1110 is cycling automatically to assure continue supply of components.

In one embodiment of the disclosed method 1000, any of the operations carried out by the system 10 described above may be performed.

The finished product produced by utilization of the disclosed system or the practice of the disclosed method may be a pro label book with a cover 802, with a backer 202, with a cover 802 and a backer 202 or with no cover 802 and no backer 202.

While this disclosure has been described as having a preferred design, the systems and methods according to the present disclosure can be further modified within the scope and spirit of this disclosure. This application is therefore intended to cover any variations, uses, or adaptations of the disclosure using its general principles. For example, the methods disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains and which fall within the limits of the appended claims.

What is claimed is:

1. A method for manufacturing a barcode label book comprising:

printing static indicia on a continuous web of label material;

applying an adhesive to a top or bottom surface of each portion of the continuous web of label material that will become a label page in a barcode label book that is not the portion of the continuous web of label material that will become a top label page of a barcode label book to be formed if the adhesive is applied to the top surface of the continuous web of label material or a bottom label page of a barcode label book to be formed if the adhesive is applied to a bottom surface of the continuous web of label material;

printing variable information on the continuous web of label material;

after the step of applying the adhesive, sheeting the continuous web of label material to form label pages, wherein each label page has at least a portion of the adhesive exposed on a top or bottom surface of the label page; and after the step of sheeting the continuous web, stacking the label pages so that adjacent label pages are adhered to one another using the exposed adhesive to form booklets.

2. The method of claim 1, further comprising attaching one of a backer or a cover to the continuous web of label material following the printing static indicia step.

3. The method of claim 2 and further comprising partially cutting through the continuous web of label material at appropriate locations to define discrete labels prior to the attaching a backer or cover step.

4. The method of claim 3 and wherein the continuous web of label material comprises a continuous web of pressure sensitive label material removably adhesively secured to a continuous web of liner material and wherein the partially cutting step includes cutting through the continuous web of pressure sensitive label material but not through the continuous web of liner material.

5. The method of claim 4 wherein the printing static indicia step includes passing the continuous web of label material through at least one flexographic label press.

6. The method of claim 2 wherein the printing static indicia step includes passing the continuous web of label material through at least one flexographic label press.

7. The method of claim 1 and wherein the step of applying an adhesive includes applying a continuous strip of adhesive to portions of the continuous web of label material that do not include the portion of the continuous web of label material that will become a top label page of a barcode label book to be formed if the adhesive is applied to the top surface of the continuous web of label material or a bottom label page of a barcode label book to be formed if the adhesive is applied to a bottom surface of the continuous web of label material.

8. The method of claim 7 further comprising pressing the stacked label pages together.

9. The method of claim 7 and further comprising stitching the label pages together.

10. A method for manufacturing a barcode label book comprising:

partially cutting through a continuous web of label material at appropriate locations to define discrete labels prior to attaching a backer or cover step;

attaching one of a backer or a cover to the continuous web of label material following the partially cutting through step;

printing variable information on the continuous web of label material;

sheeting the continuous web of label material to form label pages; and after the step of sheeting the continuous web, joining the label pages together to form booklets.

11. The method of claim 10 further comprising printing static indicia on the continuous web of label material prior to the attaching a backer or cover step.

12. The method of claim 10 and wherein the continuous web of label material comprises a continuous web of pressure sensitive label material removably adhesively secured to a continuous web of liner material and wherein the partially cutting step includes cutting through the continuous web of pressure sensitive label material but not through the continuous web of liner material.

13. The method of claim 11 wherein the printing static indicia step includes passing the continuous web of label material through at least one flexographic label press.

14. The method of claim 10 and further comprising applying an adhesive strip to a top or bottom surface of each portion of the continuous web of label material that will become a label page in a barcode label book that does not include the portion of the continuous web of label material that will become a top label page of a barcode label book to be formed if the adhesive is applied to the top surface of the continuous web of label material or a bottom label page of a barcode label book to be formed if the adhesive is applied to a bottom surface of the continuous web of label material.

15. The method of claim 14 wherein the joining step includes pressing the label pages together so that the applied adhesive joins the label pages together to form a batch wherein each batch includes all of the label pages of a barcode label book.

16. A method for manufacturing a barcode label book comprising:

providing a continuous web of label material including a web of pressure sensitive label material removably adhesively secured to a web of liner material;

printing static indicia by passing the continuous web of label material through at least one printhead that transfers ink by impression wherein static indicia is printed on the pressure sensitive label material of the provided continuous web of label material;

die cutting the continuous web of label material at appropriate locations to at least substantially cut through the continuous web of pressure sensitive label material but not to cut through the continuous web of liner material to form at least one discrete label on each portion of the continuous web of label material that will become a label page in a barcode label book;

attaching one of a backer or a cover to the continuous web of label material following the die cutting step;

applying an adhesive to a top or bottom surface of each portion of the continuous web of label material that will become a label page in a barcode label book that is not the portion of the continuous web of label material that will become a top page of a barcode label book to be formed if the adhesive is applied to the top surface of the continuous web of label material or a bottom page of a barcode label book to be formed if the adhesive is applied to a bottom surface of the continuous web of label material;

printing variable indicia on the continuous web of label material in the location of each discrete label;

after the step of applying the adhesive, sheeting the continuous web of label material to form label pages; and after the step of sheeting the continuous web, joining the label pages together utilizing the applied adhesive to form booklets.

17. The method of claim 16 wherein the step of applying an adhesive includes applying a continuous strip of adhesive to portions of the continuous web of label material that do not include the portion of the continuous web of label material that will become a top label page of a barcode label book to be formed if the adhesive is applied to the top surface of the continuous web of label material or a bottom label page of a barcode label book to be formed if the adhesive is applied to a bottom surface of the continuous web of label material.

18. The method of claim 16 wherein the joining step includes pressing the label pages together so that the applied adhesive joins the label pages together to form a batch wherein each batch includes all of the label pages of a barcode label book.

19. The method of claim 16 and further comprising stitching the label pages together.

20. The method of claim 16 wherein the printing variable indicia step includes printing one registration mark at an interval consistent with a batch quantity of labels per barcode label book, whereby said register mark is sensed to determine the attachment location of the cover or backer on the continuous web relative to a label comprising specific variable indicia at an interval consistent with the batch quantity of labels per barcode label book and whereby said register mark is sensed to determine the location to which the adhesive will not be applied to the continuous web relative to a label comprising specific variable indicia at an interval consistent with the batch quantity of labels per barcode label book.

* * * * *